(12) United States Patent
Bernatz et al.

(10) Patent No.: US 8,304,035 B2
(45) Date of Patent: Nov. 6, 2012

(54) LIQUID CRYSTAL DISPLAY

(75) Inventors: Georg Bernatz, Darmstadt (DE);
Andreas Taugerbeck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 68 days.

(21) Appl. No.: 12/675,465

(22) PCT Filed: Aug. 4, 2008

(86) PCT No.: PCT/EP2008/006402
§ 371 (c)(1),
(2), (4) Date: Feb. 26, 2010

(87) PCT Pub. No.: WO2009/030329
PCT Pub. Date: Mar. 12, 2009

(65) Prior Publication Data
US 2010/0309423 A1    Dec. 9, 2010

(30) Foreign Application Priority Data
Aug. 30, 2007 (DE) .......... 10 2007 041 112

(51) Int. Cl.
*C09K 19/00* (2006.01)
*C09K 19/02* (2006.01)
*C09K 19/06* (2006.01)
*G02F 1/13* (2006.01)
*G02F 1/1333* (2006.01)

(52) U.S. Cl. ......... 428/1.1; 428/1.3; 349/1; 349/56; 349/182; 252/299.01; 252/299.6; 252/299.61; 252/299.62; 252/299.63; 252/299.64; 252/299.65; 252/299.66

(58) Field of Classification Search ......... 428/1.1, 428/1.3; 252/299.01, 299.6–299.66; 349/1, 349/56, 182
See application file for complete search history.

(56) References Cited

U.S. PATENT DOCUMENTS

| | | | |
|---|---|---|---|
| 4,130,502 A | 12/1978 | Eidenschink et al. | |
| 4,868,341 A | 9/1989 | Eidenschink et al. | |
| 5,723,066 A | 3/1998 | Coates et al. | |
| 6,778,237 B2 | 8/2004 | Arakawa et al. | |
| 6,861,107 B2 | 3/2005 | Klasen-Memmer et al. | |
| 7,125,500 B2 * | 10/2006 | Farrand et al. | 252/299.01 |
| 7,731,865 B2 * | 6/2010 | Bernatz et al. | 252/299.01 |
| 2004/0011996 A1 | 1/2004 | Klasen-Memmer et al. | |
| 2004/0188653 A1 | 9/2004 | Kataoka et al. | |
| 2005/0264737 A1 | 12/2005 | Kataoka et al. | |
| 2006/0083868 A1 | 4/2006 | Sawatari et al. | |
| 2011/0101269 A1 * | 5/2011 | Bernatz et al. | 252/299.61 |

FOREIGN PATENT DOCUMENTS

| | | |
|---|---|---|
| DE | 2636684 A1 | 2/1978 |
| DE | 3321373 A1 | 12/1984 |
| EP | 0364538 A1 | 4/1990 |
| EP | 1306418 A1 | 5/2003 |
| EP | 1378557 A1 | 1/2004 |
| EP | 1498468 A1 | 1/2005 |
| EP | 1813594 A1 | 8/2007 |
| EP | 1889894 A1 | 2/2008 |
| EP | 1889894 W | 2/2008 |
| EP | 1944287 A1 | 7/2008 |
| JP | 10036847 A | 2/1998 |
| JP | 10036847 W | 2/1998 |
| WO | 8908633 A1 | 9/1989 |
| WO | 2007052403 A1 | 5/2007 |
| WO | PCTEP0806402 R | 10/2008 |

* cited by examiner

*Primary Examiner* — Geraldina Visconti
(74) *Attorney, Agent, or Firm* — Millen, White, Zelano & Branigan, P.C.

(57) ABSTRACT

The present invention relates to a liquid-crystal (LC) display of the PS (polymer stabilized) or PSA (polymer sustained alignment) type, and to polymerisable compounds and LC media for use in PS (polymer stabilized) and PSA displays.

20 Claims, No Drawings

LIQUID CRYSTAL DISPLAY

The present invention relates to liquid-crystal (LC) displays of the PSA (polymer sustained alignment) type, and to polymerisable compounds and LC media for use in PSA displays.

The present invention relates to liquid-crystal (LC) displays of the PS (polymer stabilised) or PSA (polymer sustained alignment) type, and to novel polymerisable compounds and novel LC media for use in PS(A) displays.

The liquid-crystal displays (LC displays) used at present are mostly those of the TN (twisted nematic) type. However, these have the disadvantage of a strong viewing-angle dependence of the contrast.

In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place.

Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are IPS (in-plane switching) displays, which contain an LC layer between two substrates, only one of which has an electrode layer, usually with a comb-shaped structure. On application of a voltage, an electric field which has a significant component parallel to the LC layer is thereby generated. This causes realignment of the LC molecules in the layer plane. Furthermore, so-called FFS (fringe field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations can exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PS (polymer stabilised) displays, which are also known under the term "PSA" (polymer sustained alignment). In these, a small amount (for example 0.3% by weight, typically <1% by weight) of a polymerisable compound is added to the LC medium and, after introduction into the LC cell, is polymerised or crosslinked in situ, usually by UV photopolymerisation, with an electrical voltage applied between the electrodes. The addition of polymerisable mesogenic or liquid-crystalline compounds, also known as "reactive mesogens" (RMs), to the LC mixture has proven particularly suitable.

In the meantime, the PS or PSA principle is being used in diverse classical LC displays. Thus, for example, PSA-VA, PSA-OCB, PS-IPS and PS-TN displays are known. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays are described, for example, in T.-J- Chen et al., Jpn. J. Appl. Phys. 45, 2006, 2702-2704 and S. H. Kim, L.-C- Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

However, it has been found that the LC mixtures and RMs known from the prior art still have some disadvantages on use in PS(A) displays. Thus, far from every desired soluble monomer is suitable for PS(A) displays, and it appears difficult to find more suitable selection criteria than just the direct PSA experiment with pretilt measurement. The choice becomes even smaller if polymerisation by means of UV light without the addition of photoinitiators is desired, which may be advantageous for certain applications. In addition, the selected "material system" of LC mixture (also referred to below as "LC host mixture")+polymerisable component should have the best possible electrical properties, in particular a high "voltage holding ratio" (HR or VHR).

The PS(A) displays disclosed in the prior art usually contain RMs in which all polymerisable groups are linked directly, i.e. without a spacer group, to the ring system of the mesogenic group ("spacerless RMs). EP 1 498 468 A1 proposes, for example, PSA-VA displays in which the LC mixtures comprise RMs selected from the following formulae:

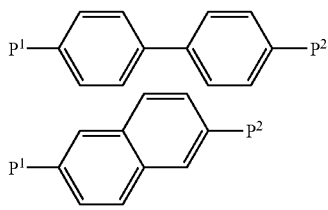

in which $P^1$ and $P^2$ denote a polymerisable group, for example an acrylate, methacrylate, vinyl, vinyloxy or epoxide group. EP 1 498 468 A1 reports that the use of such "spacerless" RMs enables improved display properties, such as, for example, lower "image burn", to be achieved.

Furthermore, EP 1 498 468 A1 reports that, by contrast, RMs in which the two polymerisable groups are linked to the mesogenic group via a spacer group, for example a flexible alkylene spacer, such as, for example, an RM of the following formula:

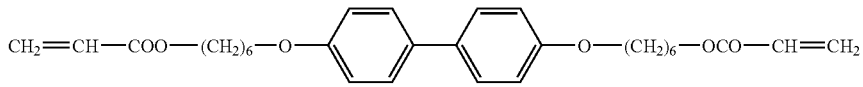

are less suitable for PSA-VA displays.

However, RMs without a spacer, like those of the above-mentioned formulae, generally have high melting points and only limited solubility in many currently common LC mixtures and therefore frequently tend to spontaneously crystallise out of the mixture. In addition, the risk of spontaneous polymerisation prevents the LC host mixture being warmed in order to dissolve the polymerisable component, meaning that the best possible solubility even at room temperature is necessary. In addition, there is a risk of separation, for example on introduction of the LC medium into the LC display (chromatography effect), which may greatly impair the homogeneity of the display. This is further increased by the fact that the LC media are usually introduced at low temperatures in order to reduce the risk of spontaneous polymerisation (see above), which in turn has an adverse effect on the solubility.

Thus, there continues to be a great demand for PS(A) displays, in particular of the VA and OCB type, and for LC media and RMs for use in such displays, which do not have the disadvantages described above or only do so to a small extent and have improved properties. In particular, there is a great demand for PS(A) displays, as well as LC media and RMs for use in such displays, having high stability to separation at low temperatures, high specific resistance at the same time as a large working-temperature range, short response times, even at low temperatures, and a low threshold voltage, which facilitate a large number of grey shades, high contrast and a wide viewing angle, and have high values for the voltage holding ratio (HR) after UV exposure.

The invention was based on the object of providing PS(A) displays which do not have the disadvantages indicated above or only do so to a lesser extent, enable the setting of a pretilt angle and preferably at the same time have very high specific resistance values, low threshold voltages and short response times.

Surprisingly, it has now been found that this object can be achieved by using PS(A) displays according to the invention which contain a polymerised compound (RM) containing a mesogenic group and two or more polymerised groups, at least one of which is linked to the mesogenic group via a spacer group and at least one of which is linked to the mesogenic group directly (i.e. without a spacer group). The advantages of the RMs according to the invention over the prior art are a lower melting point achieved by the introduction of a spacer group, a very low tendency towards crystallisation, and improved solubility in many commercially available LC host mixtures. In addition, the LC media according to the invention nevertheless exhibit adequate tilt angles, which has been demonstrated in connection with an LC medium by means of pretilt measurements in VA tilt measurement cells. In particular, it was possible to achieve a pretilt without the addition of photoinitiator.

The invention thus relates to a liquid-crystal (LC) display of the PS (polymer stabilised) or PSA (polymer sustained alignment) type, containing an LC cell consisting of two substrates, where at least one substrate is trans-parent to light and at least one substrate has an electrode layer, and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage, characterised in that at least one of the polymerisable compounds contains a mesogenic group and two or more polymerisable groups, of which at least one polymerisable group is linked to the mesogenic group via a spacer group and of which at least one polymerisable group is linked to the mesogenic group without a spacer group (i.e. directly).

Particular preference is given to LC displays in which the polymerised component consists exclusively of one or more polymerisable compounds which contain a mesogenic group and two polymerisable groups, of which one polymerisable group is linked to the mesogenic group via a spacer group and of which one polymerisable group is linked to the mesogenic group without a spacer group.

The invention furthermore relates to novel polymerisable compounds (reactive mesogens or "RMs") as described above and below.

The invention furthermore relates to an LC medium comprising one or more polymerisable compounds as described above and below.

The invention furthermore relates to an LC medium comprising
- a polymerisable component A) comprising one or more polymerisable compounds as described above and below,
- a liquid-crystalline component B), also referred to below as "LC host mixture", comprising one or more, preferably two or more, low-molecular-weight (i.e. monomeric or unpolymerised) compounds.

The invention furthermore relates to the use of polymerisable compounds as described above and below in PS and PSA displays.

The invention furthermore relates to an LC display containing one or more compounds as described above and below or an LC medium according to the invention, in particular a PS or PSA display, particularly preferably a PSA-VA, PSA-OCB, PS-IPS, PS-FFS or PS-TN display.

Particular preference is given to LC media comprising one, two or three polymerisable compounds as described above and below.

Preference is furthermore given to LC media in which the polymerisable component A) consists exclusively of polymerisable compounds as described above and below.

Preference is furthermore given to LC media in which component B) is an LC compound or an LC mixture which has a nematic liquid-crystal phase.

Particular preference is given to polymerisable compounds containing a mesogenic group having two, three or four hydrocarbon rings, which are selected from five- or six-membered rings, which may also be fused and may also contain one or more heteroatoms.

Preference is furthermore given to polymerisable compounds in which the mesogenic group is linked to a polymerisable group at precisely one position via a spacer group and at precisely one position without a spacer group.

Preference is furthermore given to achiral polymerisable compounds and LC media comprising, preferably consisting exclusively of, achiral compounds.

The polymerisable compounds can be added individually to the LC media, but it is also possible to use mixtures comprising two or more polymerisable compounds according to the invention. On polymerisation of mixtures of this type, copolymers are formed. The invention furthermore relates to the polymerisable mixtures mentioned above and below. The polymerisable compounds can be mesogenic or non-mesogenic.

In a preferred embodiment of the invention, the polymerisable compounds are selected from formula I

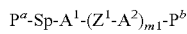

$P^a$-Sp-$A^1$-($Z^1$-$A^2$)$_{m1}$-$P^b$    I in which the individual radicals have the following meanings:
$P^a$ and $P^b$ each, independently of one another, denote a polymerisable group,
Sp denotes a spacer group,
$A^1$ and $A^2$ each, independently of one another, denote an aromatic, heteroaromatic, alicyclic or heterocyclic group, preferably having 4 to 25 C atoms, which may also contain fused rings and which may also be mono- or polysubstituted by L,
L denotes H, OH, halogen, $SF_5$, $NO_2$, a carbon group or hydrocarbon group,
$Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, $R^0$ and $R^{00}$ each, independently of one another, denote H or alkyl having 1 to 12 C atoms, m1 denotes 0, 1, 2, 3 or 4, n1 denotes 1, 2, 3 or 4.

Particularly preferred compounds of the formula I are those in which $A^1$, $A^2$, $Z^1$, Sp and m1 have the above-mentioned meanings, and $A^1$ and $A^2$ each, independently of one another, denote 1,4-phenylene, naphthalene-1,4-diyl or naphthalene-2,6-diyl, in which, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P—, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P— or P-Sp-, P denotes a polymerisable group, Y$^1$ denotes halogen, R$^x$ denotes P—, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P— or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are selected from the following sub-formulae:

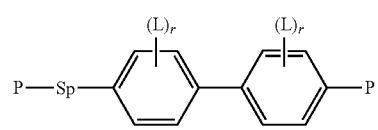

Ia

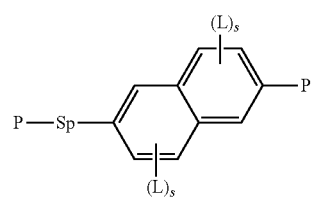

Ib

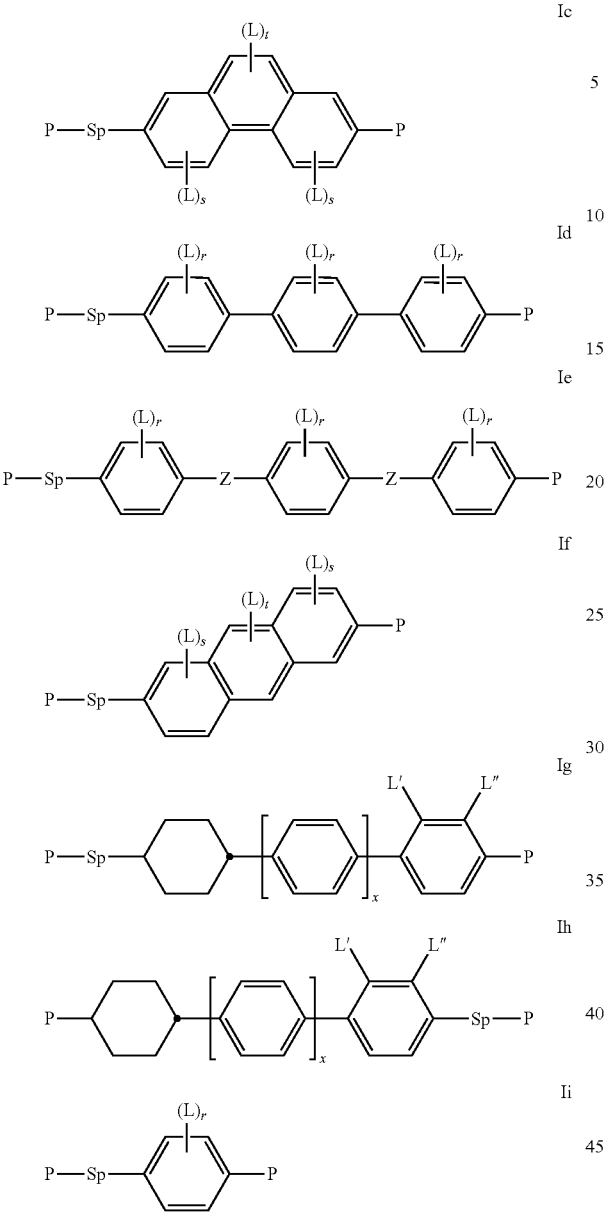

in which P and Sp on each occurrence, identically or differently, have the above-mentioned meanings, L has one of the meanings indicated above and below, L' and L" each, independently of one another, denote H, F or Cl, Z on each occurrence, identically or differently, has one of the meanings indicated for $Z^1$ above and below and preferably denotes —COO—, —OCO— or a single bond, x is 0 or 1, r is 0, 1, 2, 3 or 4, s is 0, 1, 2 or 3, and t is 0, 1 or 2.

Further preferred compounds of the formula I are those containing heterocyclic rings $A^1$ and/or $A^2$, in particular those in which one or more of the rings $A^1$ and $A^2$ present denote 1,4-phenylene, naphthalene-1,4-diyl or naphthalene-2,6-diyl, in which one or more CH groups have been replaced by N. Particularly preferred compounds of this type are selected from the following sub-formulae:

in which P, Sp, L, r and s have the above-mentioned meanings.

In the polymerisable compounds describe above and below, L and $R^x$ preferably denote a group other than P and P-Sp.

In a further preferred embodiment of the invention, the compounds of the formula I and sub-formulae thereof contain one or more branched radicals $P^a$-Sp-containing two or more polymerisable groups P (multifunctional polymerisable radicals). Suitable radicals of this type, and polymerisable compounds containing them, are described, for example, in U.S. Pat. No. 7,060,200 B1 or US 2006/0172090 A1. Particular preference is given to multifunctional polymerisable radicals selected from the following formulae:

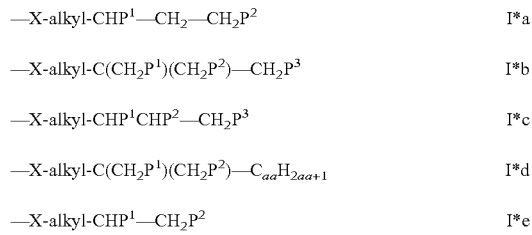

—X-alkyl-CHP¹P²    I*f

—X-alkyl-CP¹P²—C$_{aa}$H$_{2aa+1}$    I*g

—X-alkyl-C(CH$_2$P¹)(CH$_2$P²)—CH$_2$OCH$_2$—C(CH$_2$P³)(CH$_2$P⁴)CH$_2$P⁵    I*h —X-alkyl-CH((CH$_2$)$_{aa}$P¹)((CH$_2$)$_{bb}$P²)    I*i —X-alkyl-CHP¹CHP²—C$_{aa}$H$_{2aa+1}$    I*k in which alkyl denotes a single bond or straight-chain or branched alkylene having 1 to 12 C atoms, in which, in addition, one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the above-mentioned meaning and preferably denotes R⁰ as defined above, aa and bb each, independently of one another, denote 0, 1, 2, 3, 4, 5 or 6, X has one of the meanings indicated for X', and P$^{1-5}$ each, independently of one another, have one of the meanings indicated above for P.

Above and below, the following meanings apply:

Unless indicated otherwise, the term "PSA" is used to represent PS displays and PSA displays.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound ("RM").

The term "reactive mesogen" or "RM" denotes a compound containing a mesogenic group and one or more functional groups which are suitable for polymerisation (also known as polymerisable group or group P).

The terms "low-molecular-weight compound" and "unpolymerisable compound" denote compounds, usually monomeric, which do not contain any functional group which is suitable for polymerisation under the usual conditions known to the person skilled in the art, in particular under the conditions used for the polymerisation of the RMs.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also have spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" in accordance with the above definition containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ alkyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another.

R$^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)Rx, —N($R^x$)$_2$, in which Rx has the above-mentioned meaning, and $Y^1$ denotes halogen, optionally substituted silyl or aryl having 6 to 40, preferably 6 to 20 C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^o$, —$OR^o$, —CO—$R^o$, —CO—O—$R^o$, —O—CO—$R^o$ or —O—CO—O—$R^o$, in which $R^o$ has the above-mentioned meaning.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

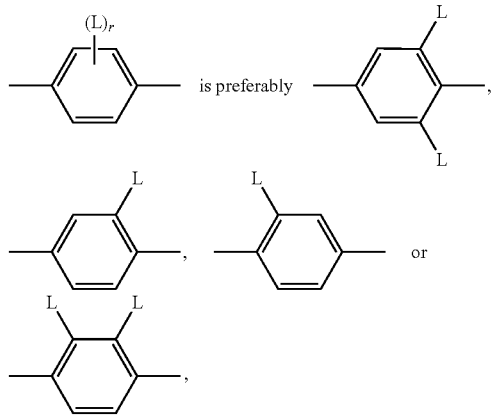

in which L has one of the above-mentioned meanings.

The polymerisable group P, $P^a$ or $P^b$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or CEO triple bond, and groups which are suitable for polymerisation with ring opening, such as, for example, oxetane or epoxide groups.

Preferred polymerisable groups are selected from $CH_2=CW^1—COO—$, $CH_2=CW^1—CO—$,

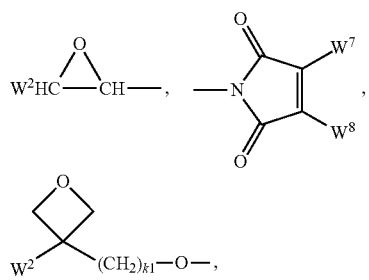

$CH_2=CW^2—(O)_{k3}—$, $CW^1=CH—CO—(O)_{k3}—$, $CW^1=CH—CO—NH—$, $CH_2=CW^1—CO—NH—$, $CH_3—CH=CH—O—$, $(CH_2=CH)_2CH—OCO—$, $(CH_2=CH—CH_2)_2CH—OCO—$, $(CH_2=CH)_2CH—O—$, $(CH_2=CH—CH_2)_2N—$, $(CH_2=CH—CH_2)_2N—CO—$, $HO—CW^2W^3—$, $HS—CW^2W^3—$, $HW^2N—$, $HO—CW^2W^3—NH—$, $CH_2=CW^1—CO—NH—$, $CH_2=CH—(COO)_{k1}$-Phe-$(O)_{k2}—$, $CH_2=CH—(CO)_{k1}$-Phe-$(O)_{k2}—$, Phe-CH=CH—, HOOC—, OCN— and $W^4W^5W^6Si—$, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, and $k_1$, $k_2$ and $k_3$ each, independently of one another, denote 0 or 1, $k_3$ preferably denotes 1.

Particularly preferred polymerisable groups are $CH_2=CH—OCO—$, $CH_2=C(CH_3)—COO—$, $CH_2=CH—$, $CH_2=CH—O—$, $(CH_2=CH)_2CH—OCO—$, $(CH_2=CH)_2CH—O—$,

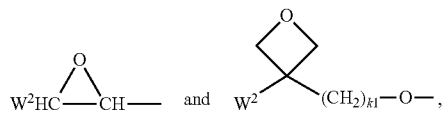

in particular vinyloxy, acrylate, methacrylate, fluoroacrylate, chloroacrylate, oxetane and epoxide.

Preferred spacer groups Sp are selected from the formula Sp'-X', so that the radical "$P^{(a,b)}$-Sp-" corresponds to the formula "$P^{(a,b)}$-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^0$—, —$SiR^0R^0$—, —CO—, —OCO—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a way that O and/or S atoms are not linked directly to one another, X' denotes —O—, —S—, —CO—, —OCO—, —OCO—, —O—OCO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—OCO—, —OCO—CH=CH— or a single bond, $R^0$ and $R^{00}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —OCO—, —OCO—, —O—OCO—, —CO—$NR^0$—, —$NR^0$—CO—, —$NR^0$—CO—$NR^0$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}—O)_{p1}$—, in which p1 is an integer from 1 to 12, q1 is an integer from 1 to 3, and $R^0$ and $R^{00}$ have the above-mentioned meanings.

Particularly preferred groups —X'-Sp'- are —$(CH_2)_{p1}$—, —O—$(CH_2)_{p1}$—, —OCO—$(CH_2)_{p1}$—, —OCOO—$(CH_2)_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The polymerisable compounds are prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerisable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-$A^1$-$(Z-A^2)_m$-, —OH, in which $A^1$, $A^2$, $Z^1$ and m have the above-mentioned meanings, such as, for example, 2,6-dihydroxynaphthalene (naphthalene-2,6-diol), or 1-(4-hydroxyphenyl)phenyl-4-ol, using corresponding acids, acid derivatives, or halogenated compounds containing a group P, such as, for example, (meth)acryloyl chloride or (meth)acrylic acid, in the presence of a dehydrating reagent, such as, for example, DCC (dicyclohexylcarbodiimide).

The polymerisable compounds are polymerised or crosslinked (if a compound contains two or more polymerisable groups) by in-situ polymerisation in the LC medium between the substrates of the LC display with application of a voltage. Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion in the mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba AG). If stabilisers are employed, their proportion, based on the total amount of RMs or polymerisable component A), is preferably 10-5000 ppm, particularly preferably 50-500 ppm.

The polymerisable compounds according to the invention are particularly suitable for polymerisation without initiator, which is associated with considerable advantages, such as, for example, lower material costs and in particular less contamination of the LC medium by possible residual amounts of the initiator or degradation products thereof.

The LC media according to the invention preferably comprise <5%, particularly preferably <1%, very particularly preferably <0.5%, of polymerisable compounds, in particular polymerisable compounds of the above-mentioned formulae.

The polymerisable compounds according to the invention can be added individually to the LC media, but it is also possible to use mixtures comprising two or more polymerisable compounds according to the invention or mixtures comprising one or more polymerisable compounds according to the invention and one or more additional polymerisable compounds (comonomers). The comonomers can be mesogenic or non-mesogenic. On polymerisation of mixtures of this type, copolymers are formed. The invention furthermore relates to the polymerisable mixtures mentioned above and below.

Suitable and preferred mesogenic comonomers are, for example, those selected from the following formulae:

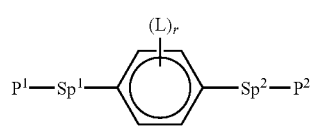

I*1

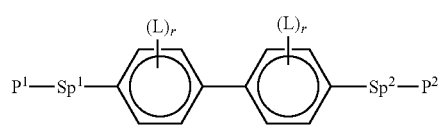

I*2

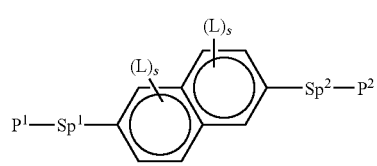

I*3

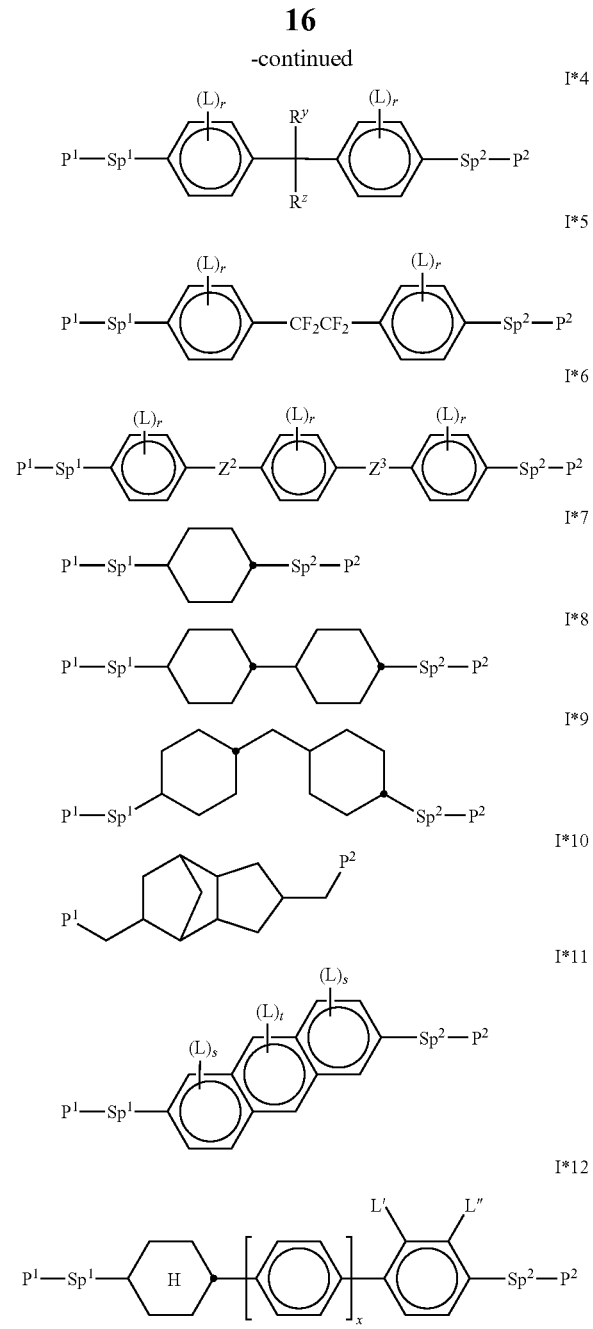

in which
P$^1$ and P$^2$ have one of the meanings indicated for P and preferably denote acrylate or methacrylate,
Sp$^1$ and Sp$^2$ have one of the meanings indicated for Sp or denote a single bond,
Z$^2$ and Z$^3$ each, independently of one another, denote —COO— or —OCO—,
L denotes P-Sp-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-,
L' and L" each, independently of one another, denote H, F or Cl, r denotes 0, 1, 2, 3 or 4,
s denotes 0, 1, 2 or 3,
t denotes 0, 1 or 2,
x denotes 0 or 1, and
$R^y$ and $R^z$ each, independently of one another, denote H or $CH_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for the polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays are described in EP 1 378 557 A1 and mixtures for OCB displays are described in EP 1 306 418 A1 and DE 102 24 046 A1.

Particularly preferred host mixtures and LC media are indicated below:

a) LC medium which comprises one or more compounds selected from the following formulae:

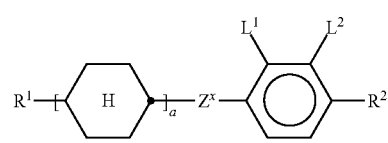

CY

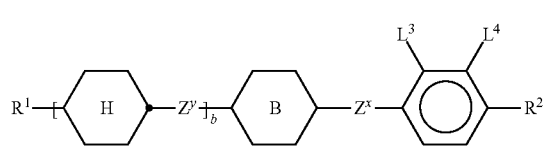

PY in which the individual radicals have the following meanings:
a denotes 1 or 2,
b denotes 0 or 1,

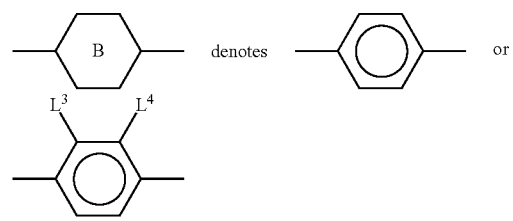

$R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —OCO— in such a way that O atoms are not linked directly to one another, preferably alkyl or alkoxy having 1 to 6 C atoms,
$Z^x$ and $Z^y$ each, independently of one another, denote —$CH_2CH_2$—, —CH=CH—, —$CF_2O$—, —$OCF_2$—, —$CH_2O$—, —$OCH_2$—, —OCO—, —OCO—, —$C_2F_4$—, —CF=CF—, —CH=$CHCH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both radicals $L^1$ and $L^2$ denote F, or one of the radicals $L^1$ and $L^2$ denotes F and the other denotes Cl, or both radicals $L^3$ and $L^4$ denote F, or one of the radicals $L^3$ and $L^4$ denotes F and the other denotes Cl.

The compounds of the formula CY are preferably selected from the following sub-formulae:

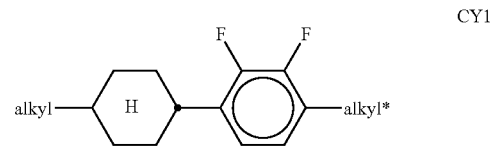

CY1

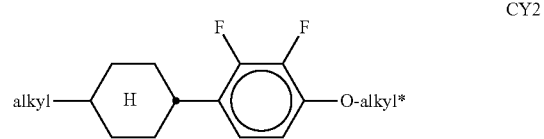

CY2

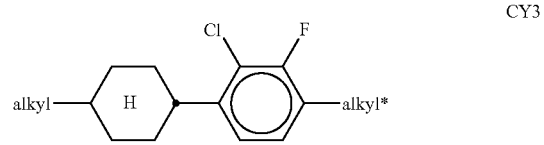

CY3

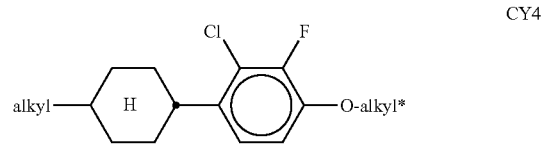

CY4

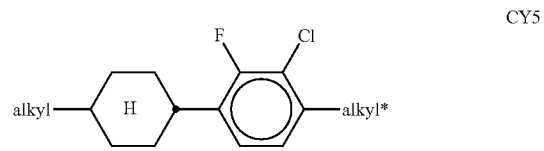

CY5

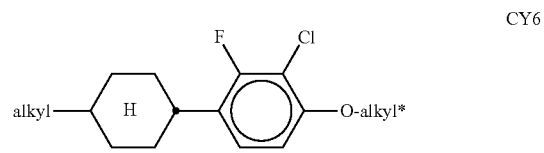

CY6

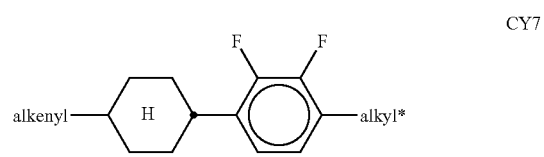

CY7

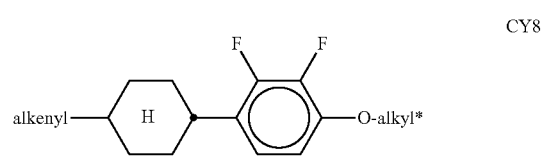

CY8

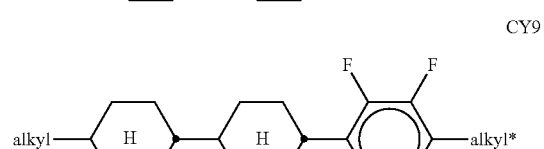

CY9

-continued
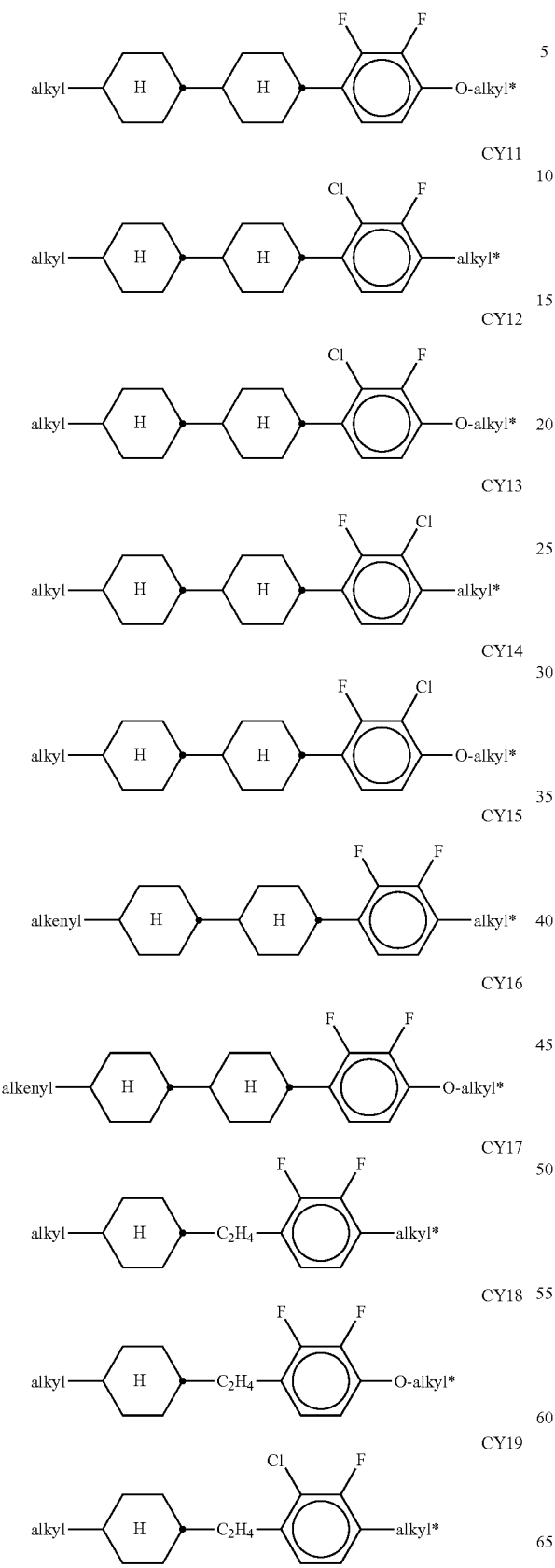
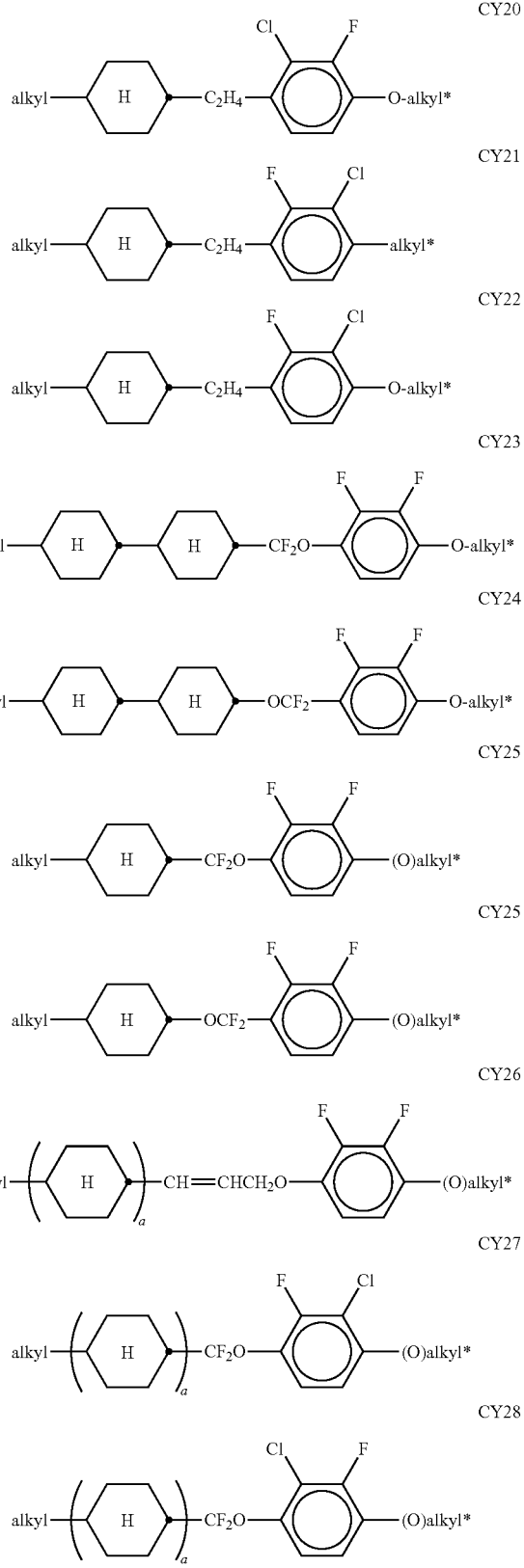
in which a denotes 1 or 2, alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the following sub-formulae:

PY1
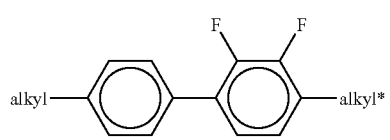

PY2
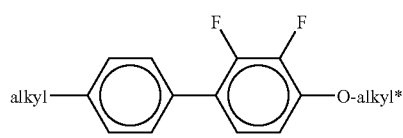

PY3
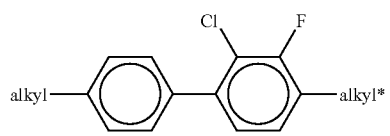

PY4
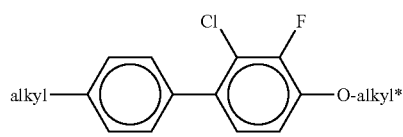

PY5
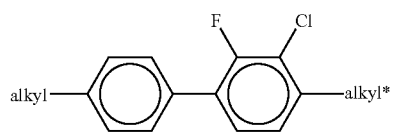

PY6
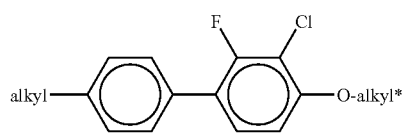

PY7
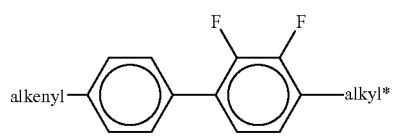

PY8
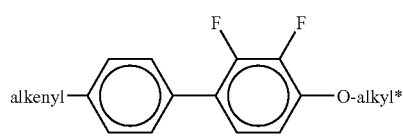

PY9
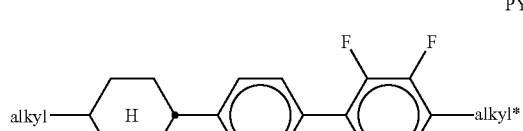

PY10
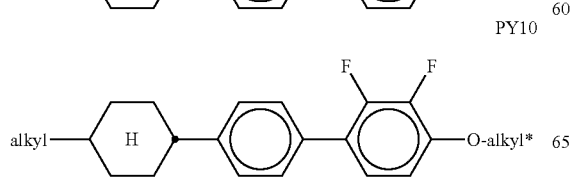

-continued

PY11
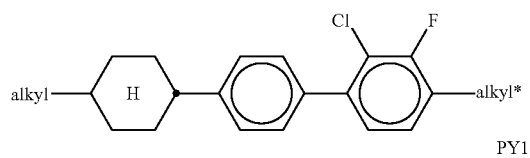

PY12
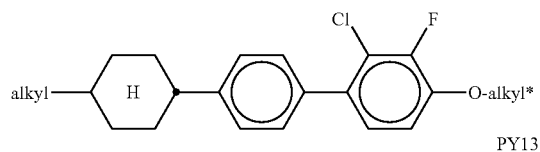

PY13
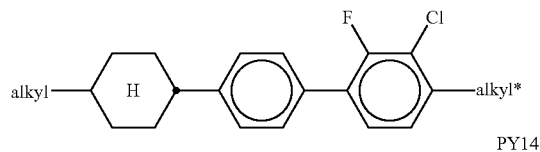

PY14
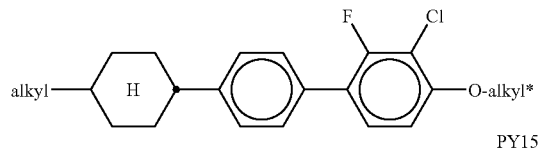

PY15
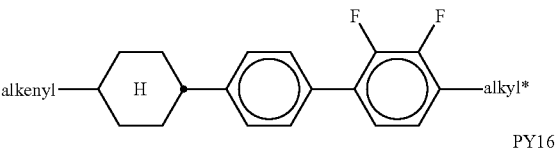

PY16
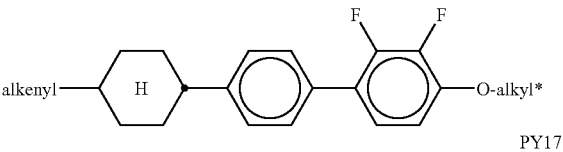

PY17
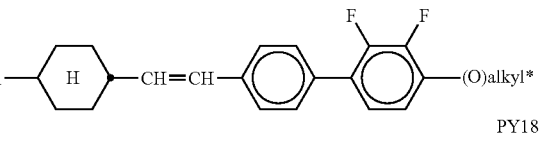

PY18
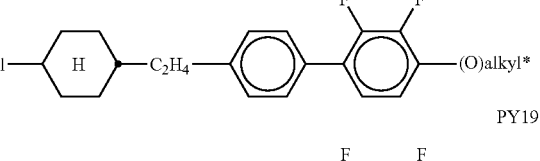

PY19
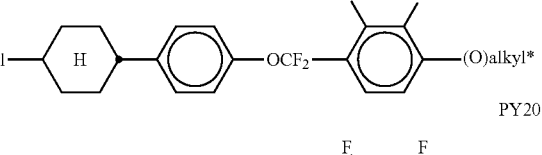

PY20 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes

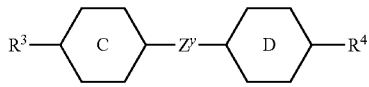

b) LC medium which additionally comprises one or more compounds of the following formula:

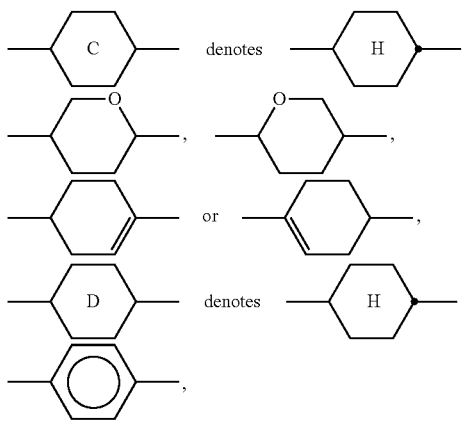

ZK in which the individual radicals have the following meanings:

C denotes or

,

D denotes or

, $R^3$ and $R^4$ each, independently of one another, denote alkyl having 1 to 12 C atoms, in which, in addition, one or two non-adjacent $CH_2$ groups may be replaced by —O—, —CH=CH—, —CO—, —OCO— or —OCO— in such a way that O atoms are not linked directly to one another, $Z^y$ denotes —$CH_2CH_2$—, —CH=CH—, —$CF_2$O—, —$OCF_2$—, —$CH_2$O—, —$OCH_2$—, —OCO—, —OCO—, —$C_2F_4$—, —CF=CF—, —CH=CH$CH_2$O— or a single bond, preferably a single bond.

The compounds of the formula ZK are preferably selected from the following sub-formulae:

ZK1

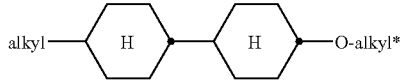
ZK2

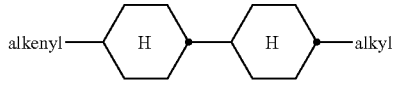
ZK3

ZK4

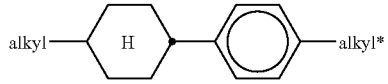
ZK5

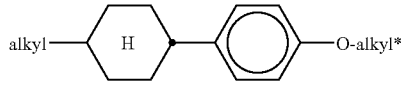
ZK6

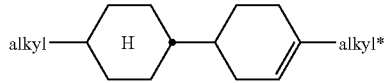
ZK7

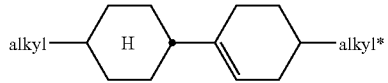
ZK8

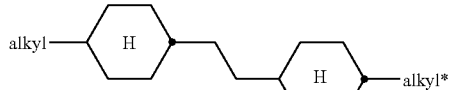
ZK9

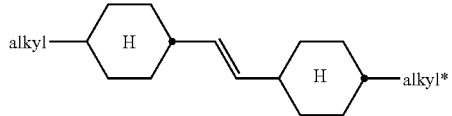
ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$=CH—, $CH_2$=CH$CH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

c) LC medium which additionally comprises one or more compounds of the following formula:

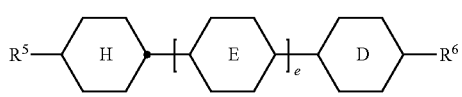
DK in which the individual radicals have on each occurrence, identically or differently, the following meanings:

$R^5$ and $R^6$ each, independently of one another, have one of the meanings indicated above for $R^1$, D denotes or

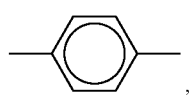

,

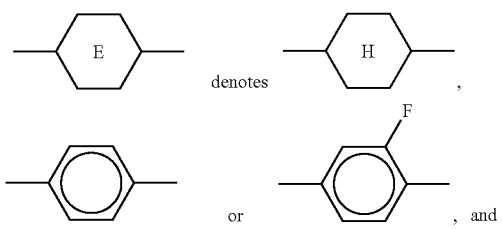

denotes e denotes 1 or 2.

The compounds of the formula DK are preferably selected from the following sub-formulae:

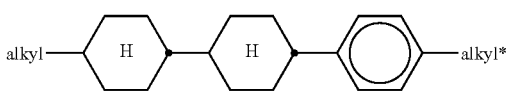
DK1

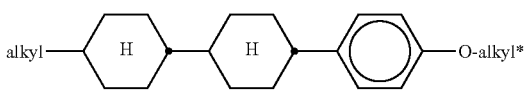
DK2

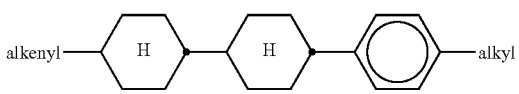
DK3

DK4

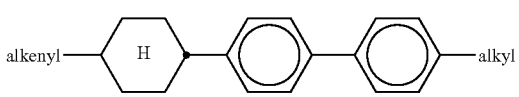
DK5

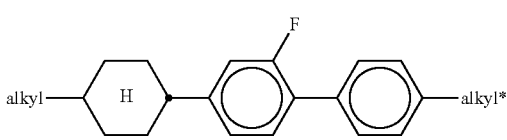
DK6

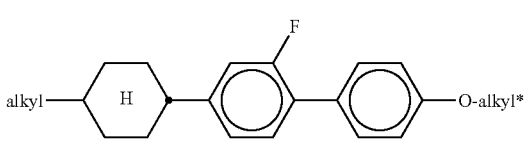
DK7

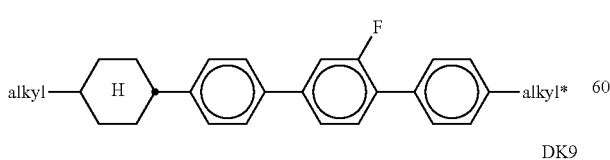
DK8

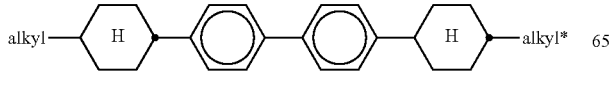
DK9

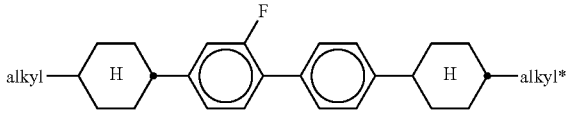
DK10 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

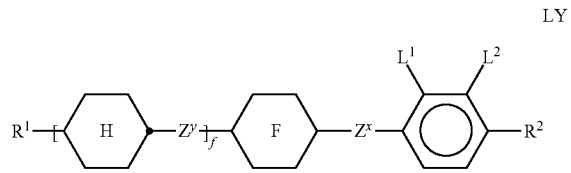
LY in which the individual radicals have the following meanings:

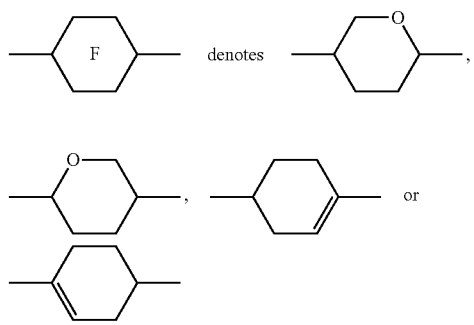

f denotes 0 or 1, $R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —OCO— in such a way that O atoms are not linked directly to one another, $Z^x$ and $Z^y$ each, independently of one another, denote —$CH_2CH_2$—, —CH=CH—, —$CF_2O$—, —$OCF_2$—, —$CH_2O$—, —$OCH_2$—, —OCO—, —OCO—, —$C_2F_4$—, —CF=CF—, —$CH=CHCH_2O$— or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula L^y are preferably selected from the following sub-formulae:

LY1
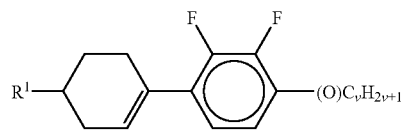

LY2
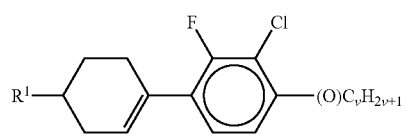

LY3
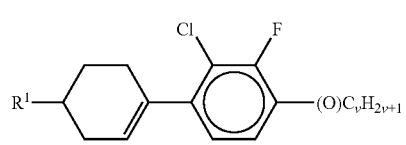

LY4
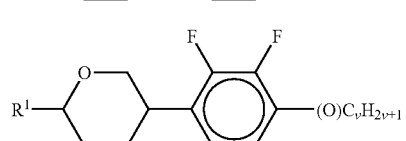

LY5
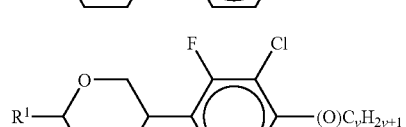

LY6
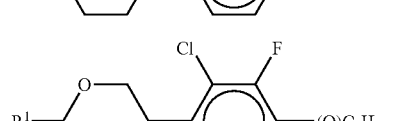

LY7
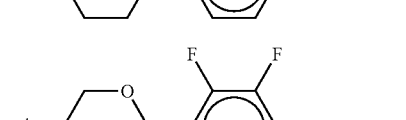

LY8
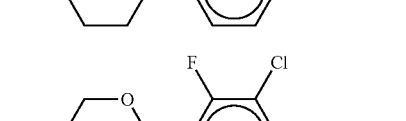

LY9
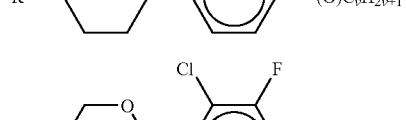

LY10
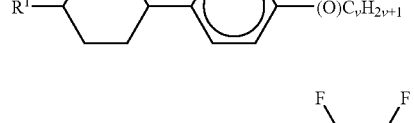

LY11
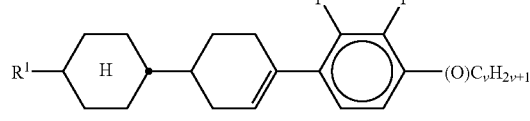

LY12
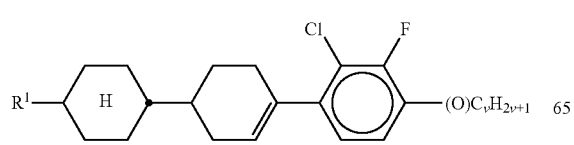

LY13
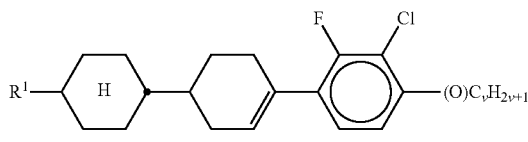

LY14
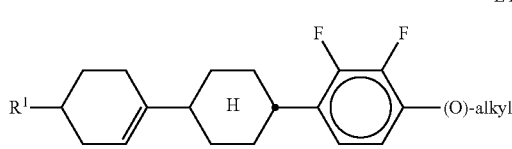

LY15
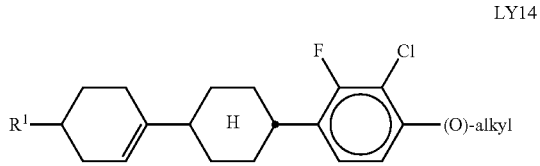

LY16
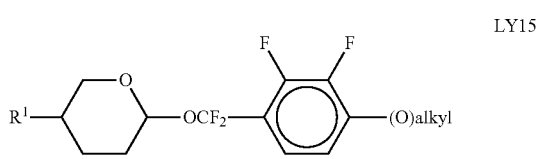

LY17
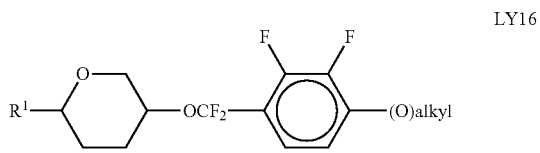

LY18
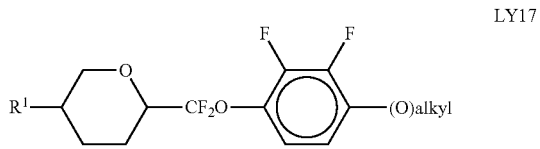

in which $R^1$ has the above-mentioned meaning, and v denotes an integer from 1 to 6. $R^1$ preferably denotes straight-chain alkyl or alkenyl, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

e) LC medium which additionally comprises one or more compounds selected from the following formulae:

G1
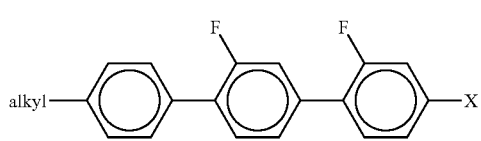

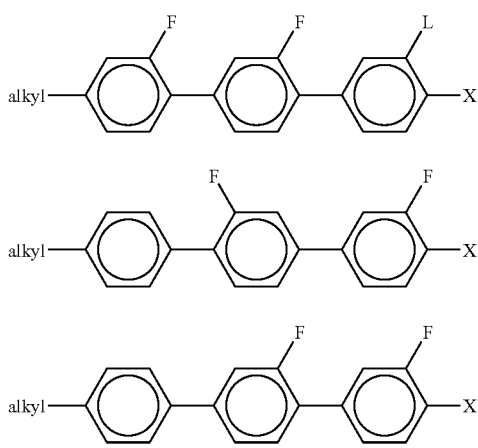

in which alkyl denotes $C_{1-6}$-alkyl, L denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the following formulae:

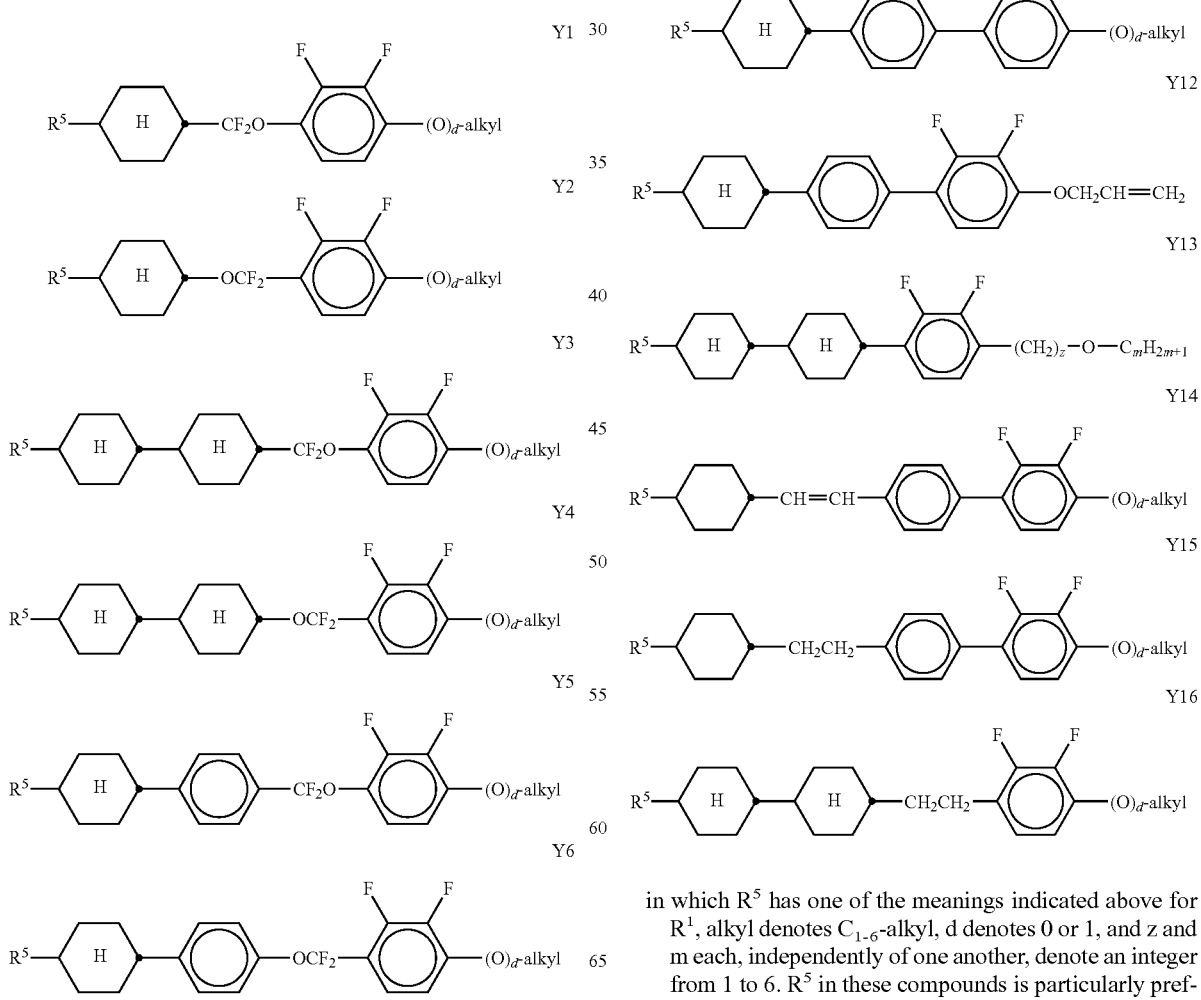

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the abovementioned formulae in amounts of 5% by weight.

g) LC medium which additionally comprises one or more biphenyl compounds of the following formulae:

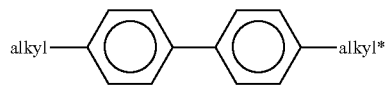
B1

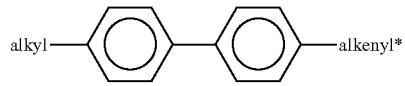
B2

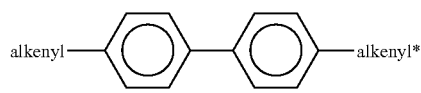
B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular 5% by weight.

The compounds of the formula B2 are particularly preferred.

The compounds of the formulae B1 to B3 are preferably selected from the following sub-formulae:

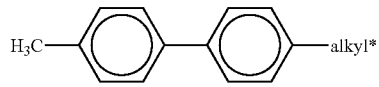
B1a

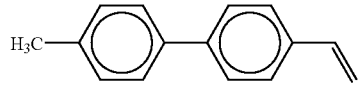
B2a

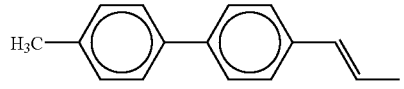
B2b

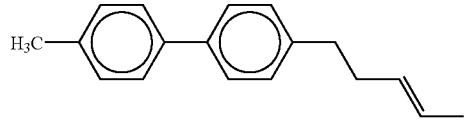
B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

T in which $R^5$ and $R^6$ each, independently of one another, have one of the meanings indicated above for $R^1$, and

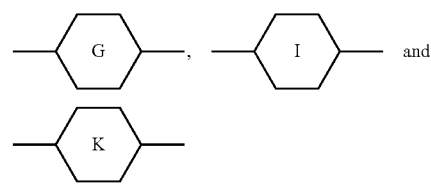

each, independently of one another, denote

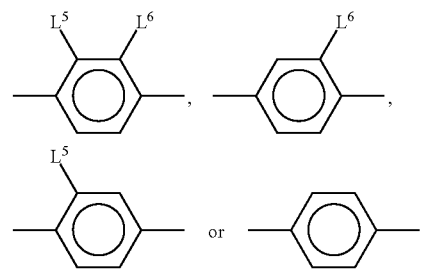

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the following sub-formulae:

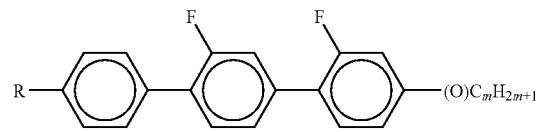
T1

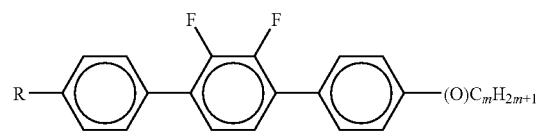
T2

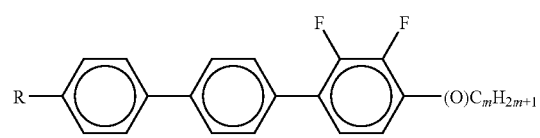
T3

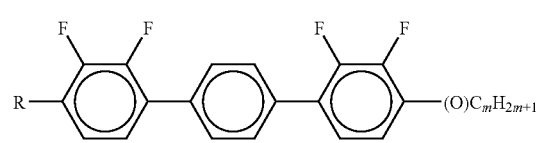
T4

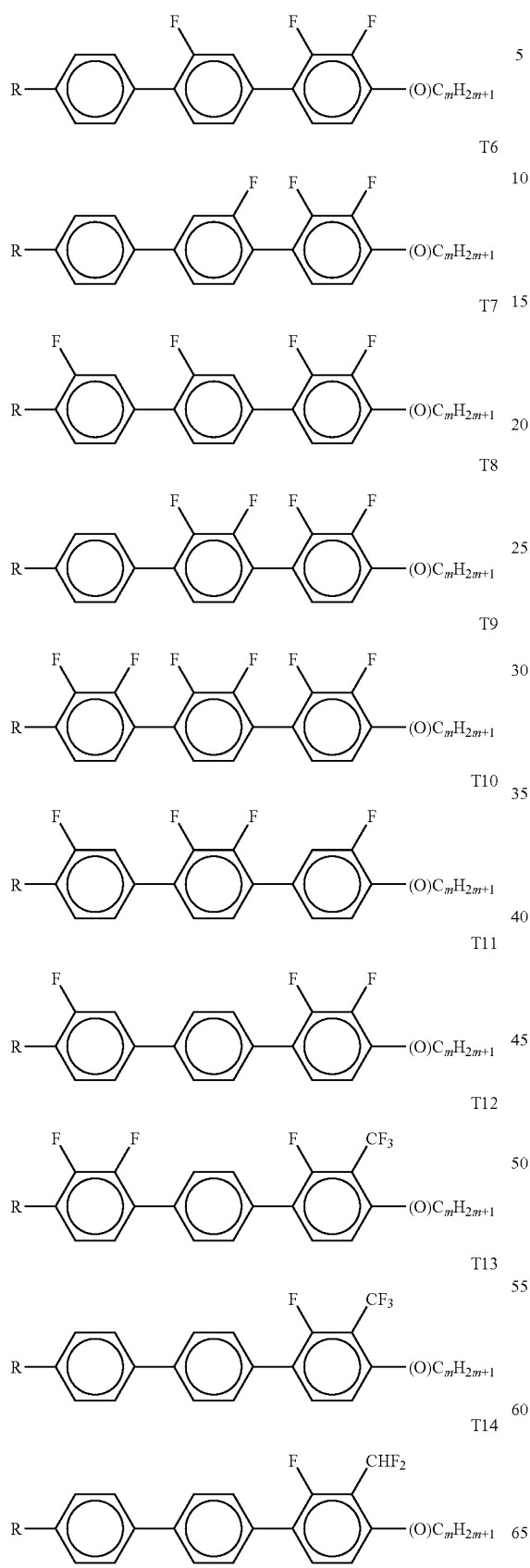
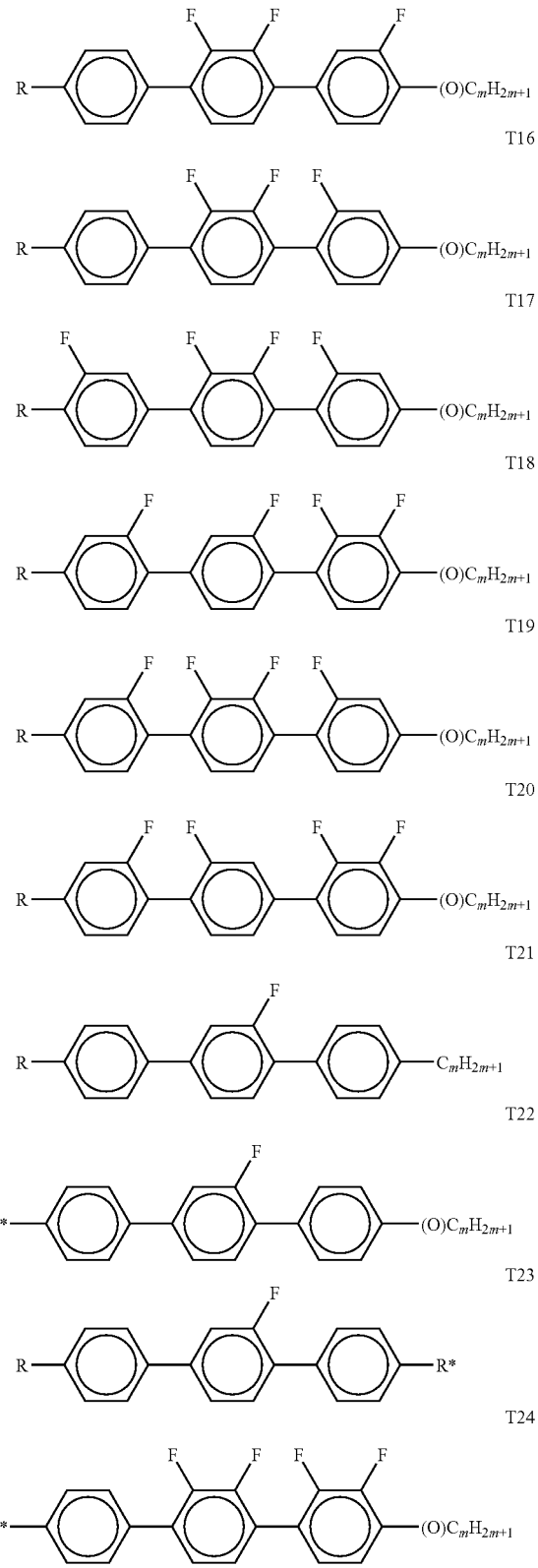
in which R denotes a straight-chain alkyl or alkoxy radical having 1-7 C atoms, R* denotes a straight-chain alkenyl radical having 2-7 C atoms, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of the compounds T1 to T22.

i) LC medium which additionally comprises one or more compounds of the following formulae:

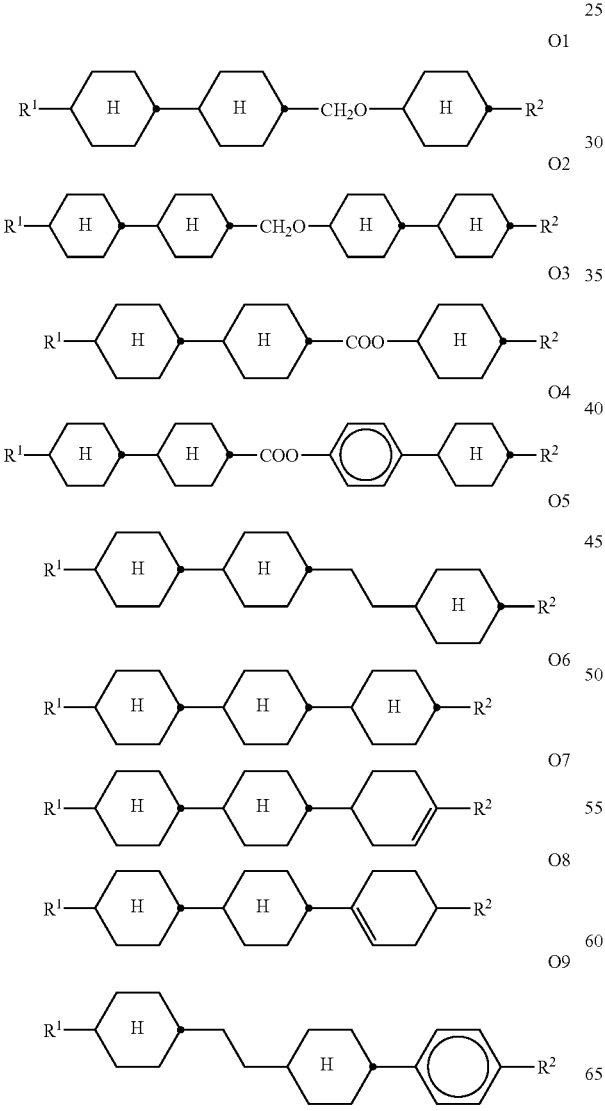

in which R$^1$ and R$^2$ have the above-mentioned meanings and preferably each, independently of one another, denote straight-chain alkyl or alkenyl.

Preferred media comprise one or more compounds selected from the formulae O1, O3 and O4.

k) LC medium which additionally comprises one or more compounds of the following formula:

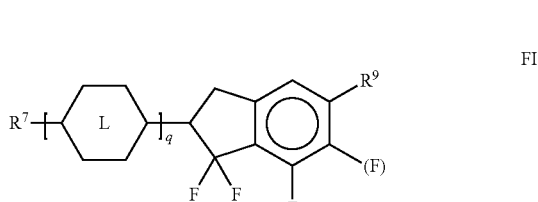

in which

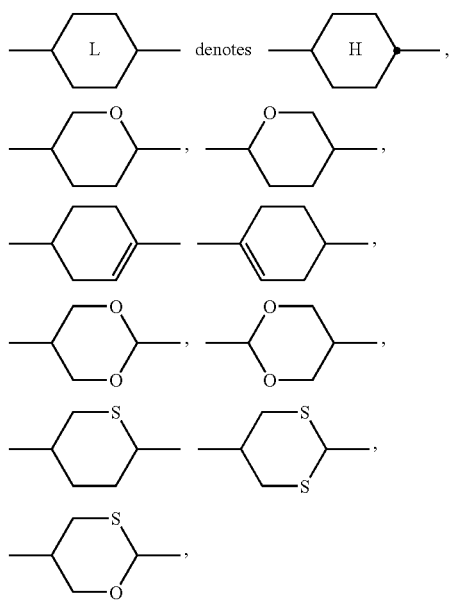

L denotes

R$^9$ denotes H, CH$_3$, C$_2$H$_5$ or n-C$_3$H$_7$, and q denotes 1, 2 or 3, and R$^7$ has one of the meanings indicated for R$^1$, preferably in amounts of >3% by weight, in particular 5% by weight and very particularly preferably 5-30% by weight.

Particularly preferred compounds of the formula IF are selected from the following sub-formulae:

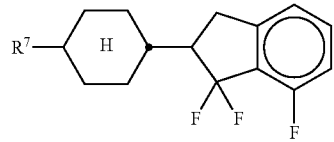
FI1

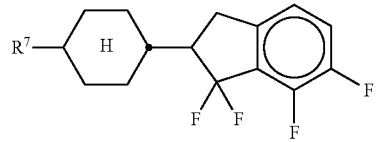
FI2

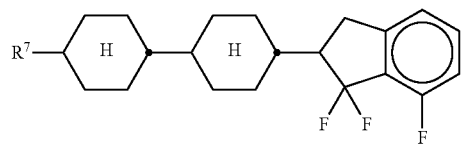
FI3

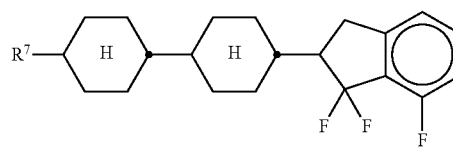
FI4

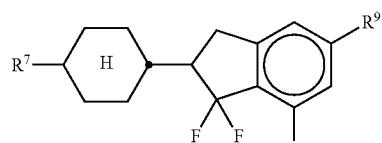
FI5

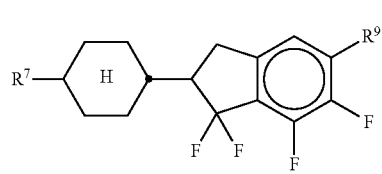
FI6

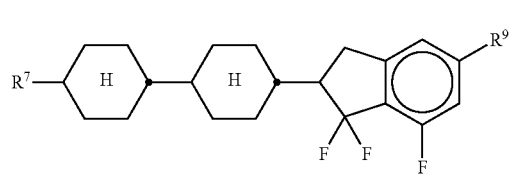
FI7

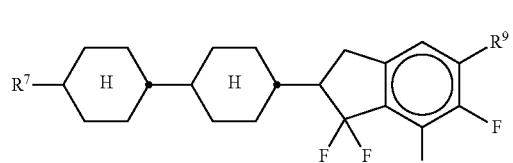
FI8 in which $R^7$ preferably denotes straight-chain alkyl, and $R^9$ denotes $CH_3$, $C_2H_5$ or $n\text{-}C_3H_7$. Particular preference is given to the compounds of the formulae FI1, FI2 and FI3.

m) LC medium which additionally comprises one or more compounds of the following formulae:

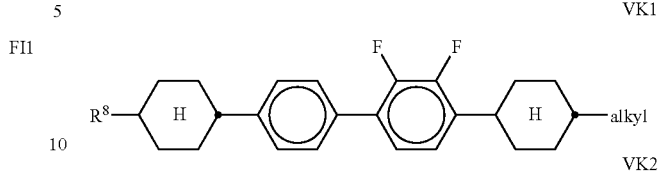
VK1

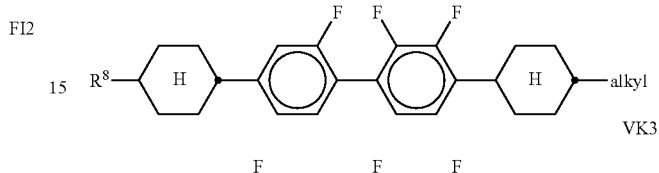
VK2

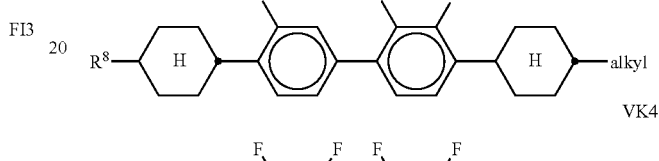
VK3

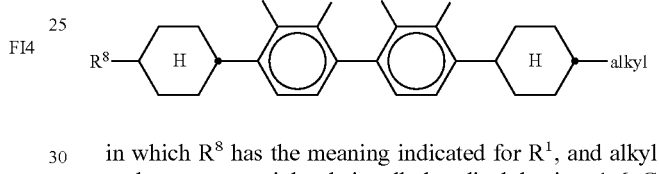
VK4 in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the following formulae:

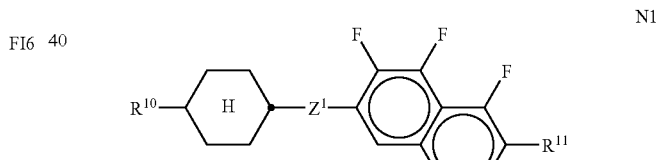
N1

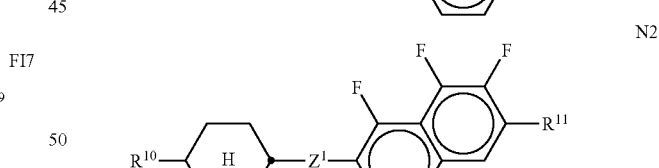
N2

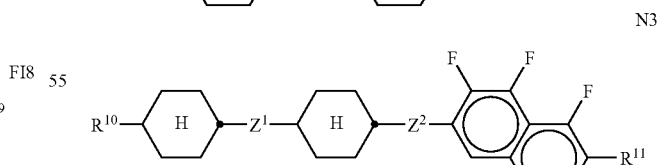
N3

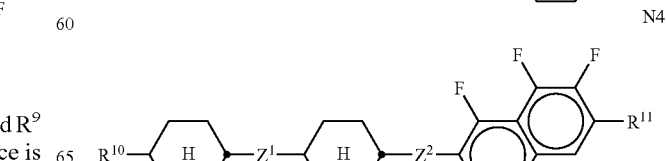
N4

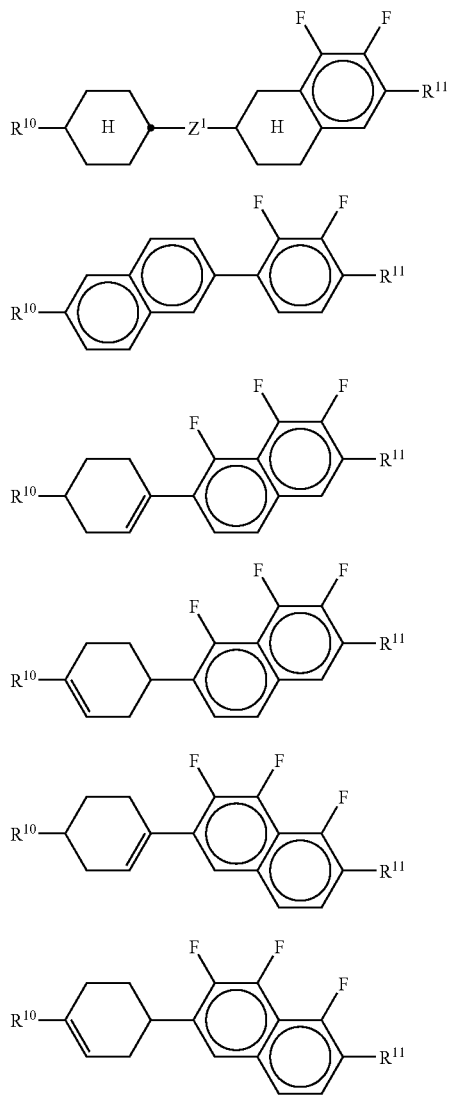

in which $R^{10}$ and $R^{11}$ each, independently of one another, have one of the meanings indicated for $R^1$, preferably denote straight-chain alkyl, straight-chain alkoxy or straight-chain alkenyl, and Z, $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —OCO—, —OCO—, —$C_2F_4$—, —CF=CF—, —CF=CH—, —CH=CF—, —CH$_2$— or a single bond.

o) LC medium which additionally comprises one or more difluoro-dibenzochromans and/or chromans of the following formulae:

BC

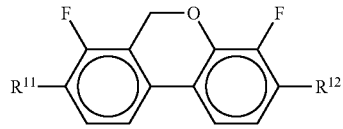

CR

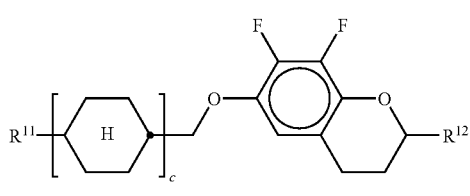

in which $R^{11}$ and $R^{12}$ each, independently of one another, have the above-mentioned meaning, and c denotes 0 or 1, preferably in amounts of 3 to 20% by weight, in particular in amounts of 3 to 15% by weight.

Particularly preferred compounds of the formulae BC and CR are selected from the following sub-formulae:

BC1

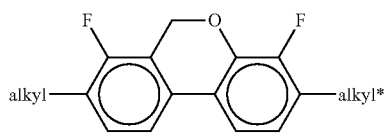

BC2

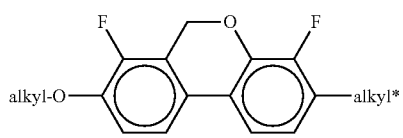

BC3

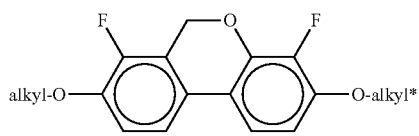

BC4

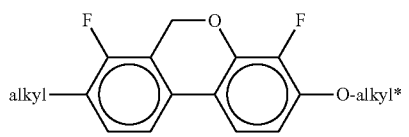

BC5

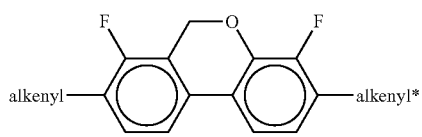

BC6

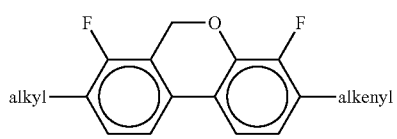

BC7

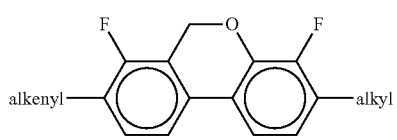

CR1

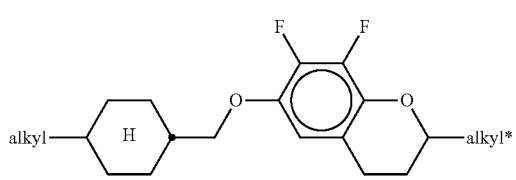

-continued

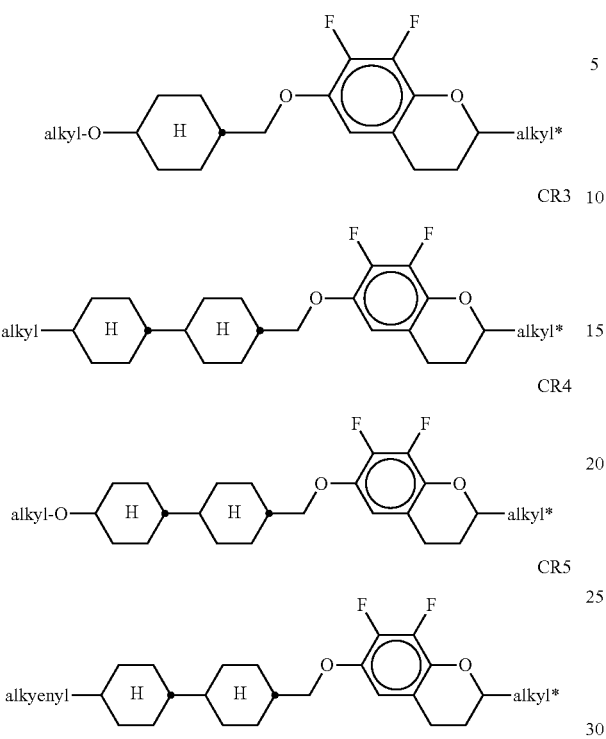

CR2
CR3
CR4
CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

p) LC medium which additionally comprises one or more fluorinated phenanthrenes or dibenzofurans of the following formulae:

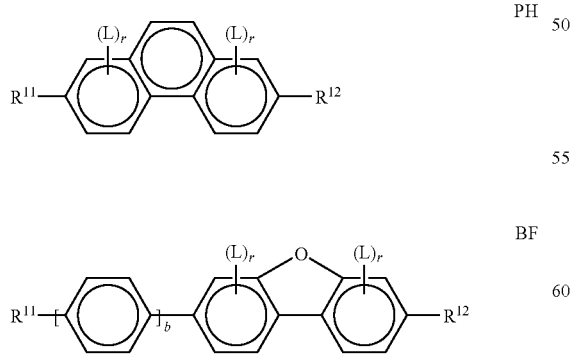

PH
BF in which $R^{11}$ and $R^{12}$ each, independently of one another, have the above-mentioned meanings, b denotes 0 or 1, L denotes F, and r denotes 1, 2 or 3.

Particularly preferred compounds of the formulae PH and BF are selected from the following sub-formulae:

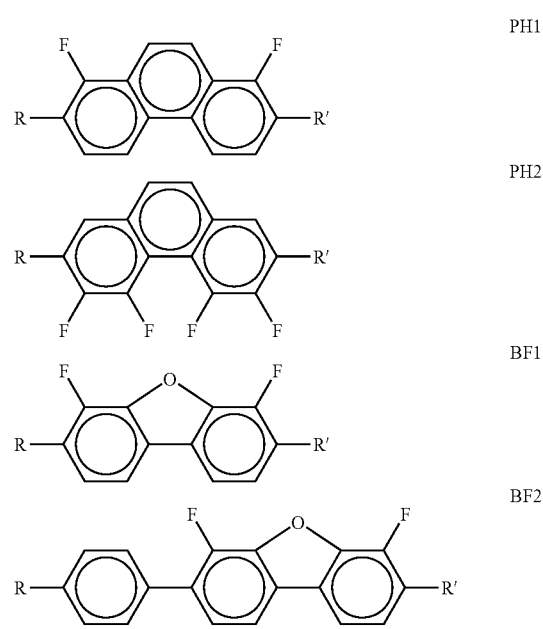

PH1
PH2
BF1
BF2 in which R and R' each, independently of one another, denote a straight-chain alkyl or alkoxy radical having 1-7 C atoms.

q) LC medium, preferably for use in PSA-OCB displays, which comprises one or more compounds of the following formulae:

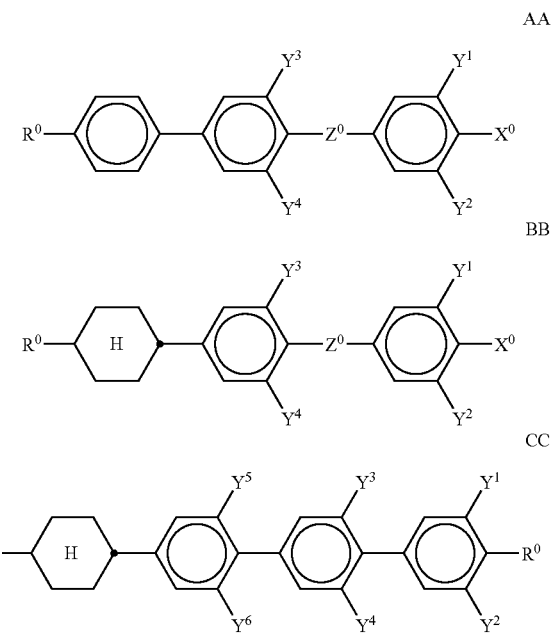

AA
BB
CC in which
$R^0$ on each occurrence, identically or differently, denotes n-alkyl, alkoxy, oxaalkyl, fluoroalkyl or alkenyl, each having up to 9 C atoms,
$X^0$ denotes F, Cl or in each case halogenated alkyl, alkenyl, alkenyloxy or alkoxy, each having up to 6 C atoms, $Z^0$ denotes —CF$_2$O— or a single bond, $Y^{1-6}$ each, independently of one another, denote H or F.

$X^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, particularly preferably F or OCF$_3$.

The compounds of the formula AA are preferably selected from the following formulae:

AA1
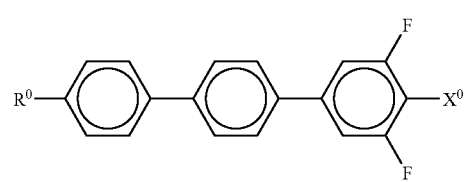

AA2
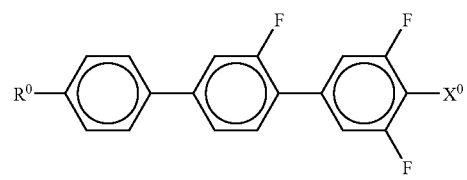

AA3
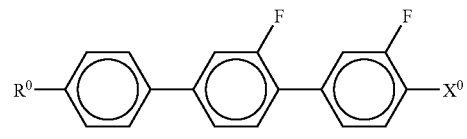

AA4
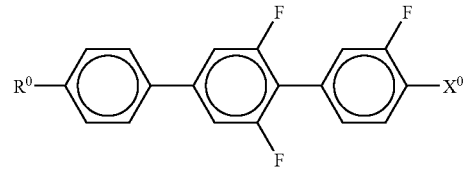

AA5
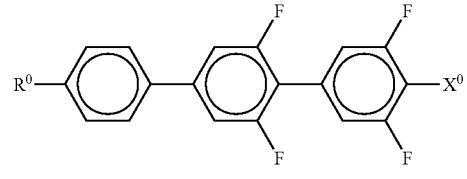

AA6
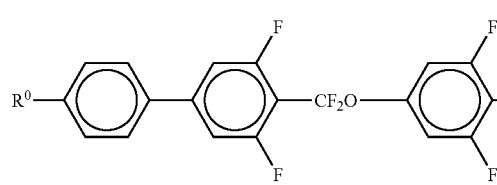

AA7
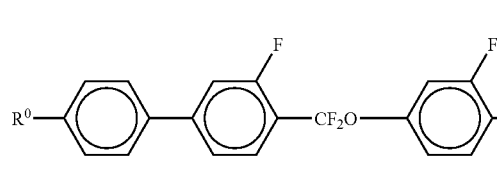

AA8
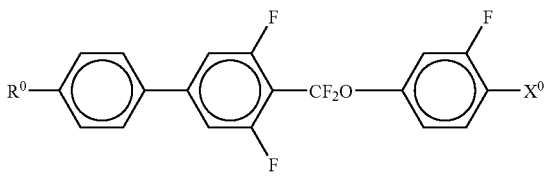

AA9
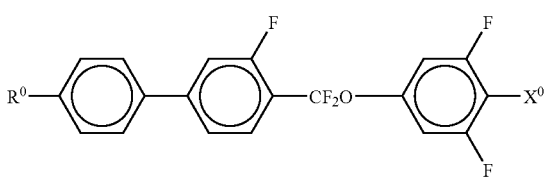

in which $R^0$ and $X^0$ have the above-mentioned meanings, and $X^0$ preferably denotes F. Particular preference is given to compounds of the formulae AA2 and AA6.

The compounds of the formula BB are preferably selected from the following formulae:

BB1
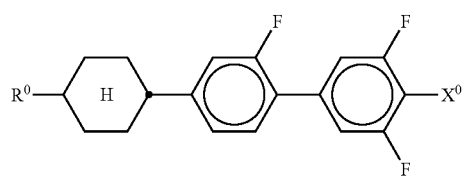

BB2
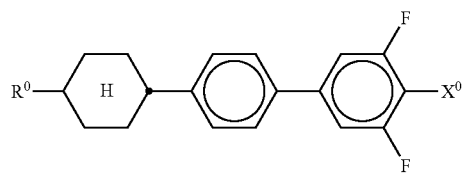

BB3
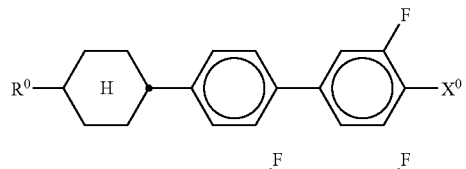

BB4
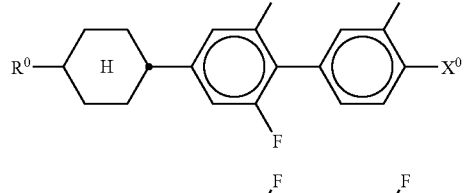

BB5
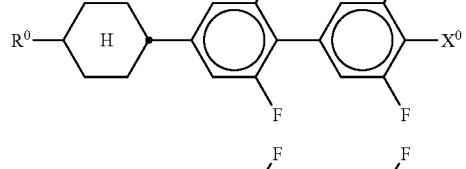

BB6
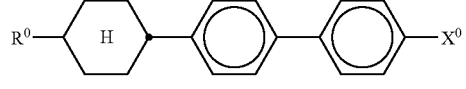

in which R⁰ and X⁰ have the above-mentioned meanings, and X⁰ preferably denotes F. Particular preference is given to compounds of the formulae BB1, BB2 and BBS.

The compounds of the formula CC are preferably selected from the following formula:

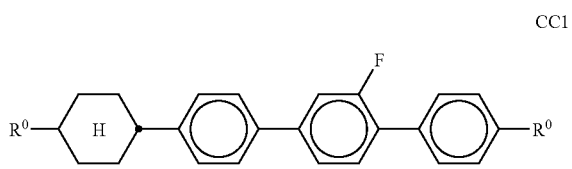

CC1 in which R⁰ on each occurrence, identically or differently, has the above-mentioned meaning and preferably denotes alkyl having 1 to 6 C atoms.

r) LC medium which, apart from the polymerisable compounds of the formula I or sub-formulae thereof and the comonomers, comprises no compounds which contain a terminal vinyl or vinyloxy group (—CH=CH$_2$, —O—CH=CH$_2$).

s) LC medium which comprises 1 to 5, preferably 1, 2 or 3, polymerisable compounds.

t) LC medium in which the proportion of polymerisable compounds in the mixture as a whole is 0.05 to 5%, preferably 0.1 to 1%.

u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the mixture as a whole is greater than 70%, preferably greater than 80%.

y) LC medium which comprises in addition one or more, preferably low-molecular-weight and/or non-polymerisable, chiral dopants, very preferably selected from Table B, preferably in the concentration ranges given for Table B.

The combination of compounds of the preferred embodiments a)-x) mentioned above with the polymerised compounds described above effects low threshold voltages, low rotational viscosities and very good low-temperature stabilities with maintenance of high clearing points and high HR values in the LC media according to the invention and allows a pretilt angle to be set in PS(A) displays. In particular, the LC media exhibit significantly shortened response times, in particular also the grey-shade response times, in PS(A) displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy Δ∈, preferably of about −0.5 to −7.5, in particular of about −2.5 to −5.5, at 20° C. and 1 kHz.

LC media according to the invention for use in displays of the OCB type have a positive dielectric anisotropy Δ∈, preferably of about +7 to +17 at 20° C. and 1 kHz.

The birefringence Δn in LC media according to the invention for use in displays of the VA type is preferably less than 0.16, particularly preferably between 0.06 and 0.14, in particular between 0.07 and 0.12.

The birefringence Δn in LC media according to the invention for use in displays of the OCB type is preferably between 0.14 and 0.22, in particular between 0.16 and 0.22.

The dielectrics may also comprise further additives known to the person skilled in the art and described in the literature. For example, 0 to 15% by weight of pleochroic dyes may be added, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-x) of the LC media according to the invention are either known or the ways in which they are prepared can readily be derived from the prior art by the person skilled in the relevant art since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the conventional geometry for PS(A) displays, as described in the prior art cited at the outset. Geometries without protrusions are preferred, in particular those in which, in addition, the electrode on the colour filter side is unstructured and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

The following abbreviations and acronyms are used: (m, m, z: each, independently of one another, 1, 2, 3, 4, 5 or 6)
TABLE A
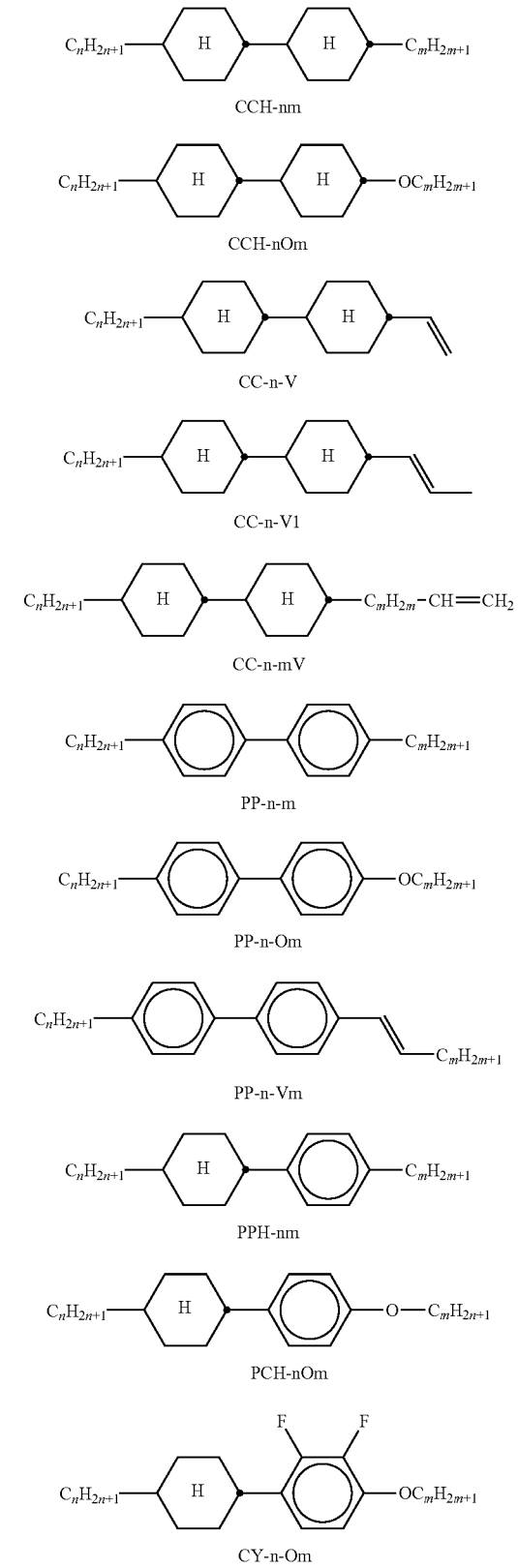

TABLE A-continued
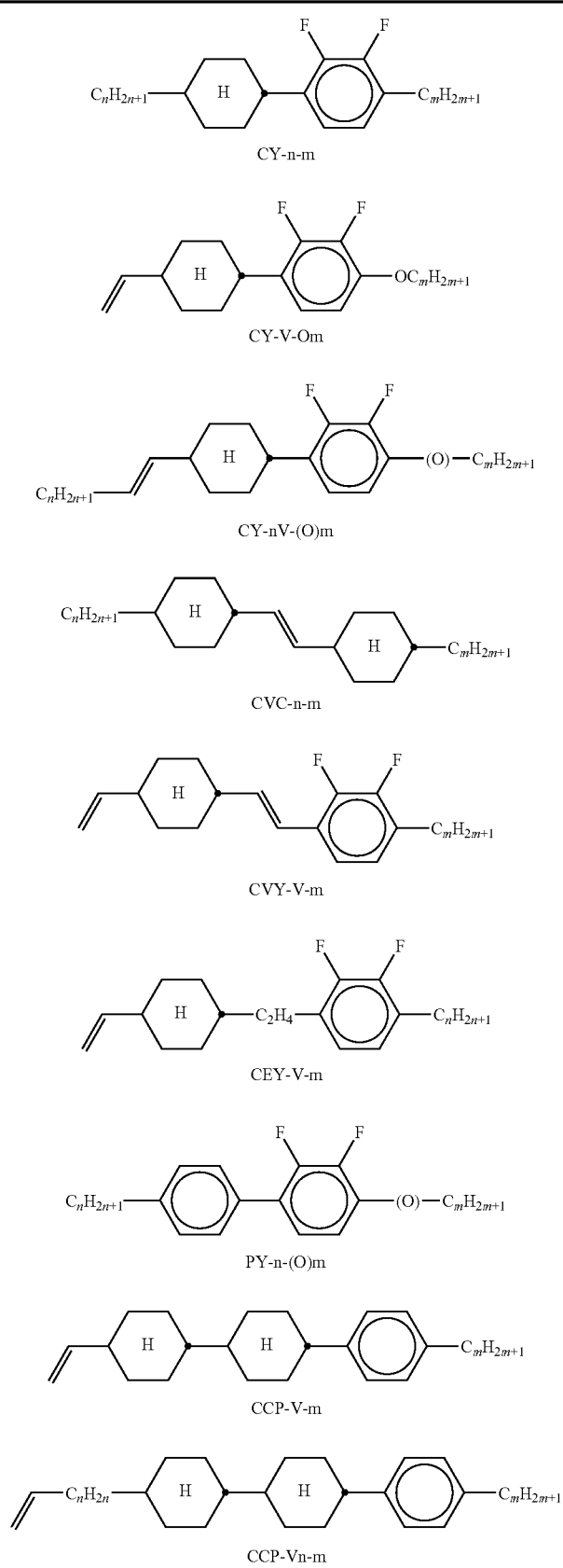

TABLE A-continued
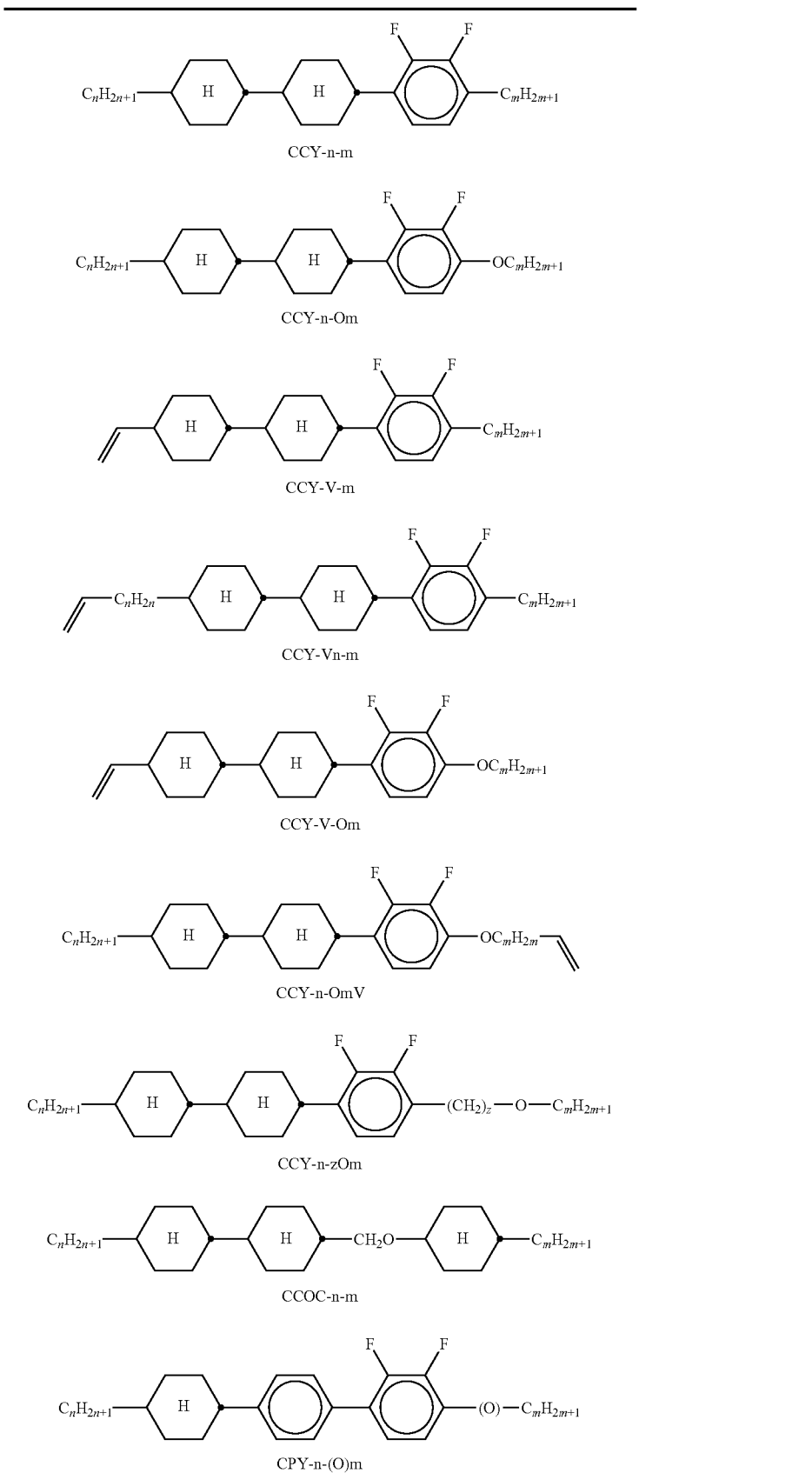

TABLE A-continued
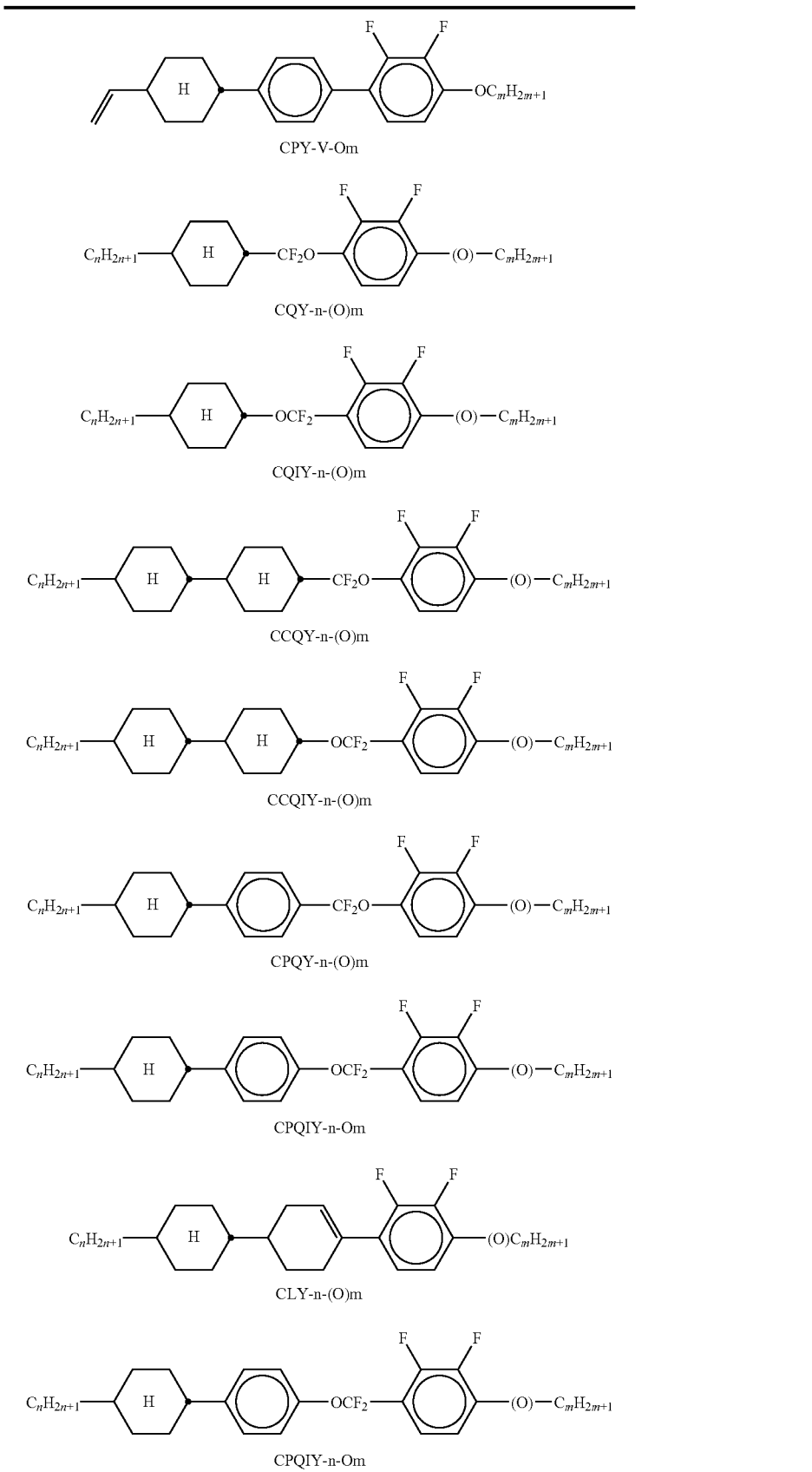

TABLE A-continued
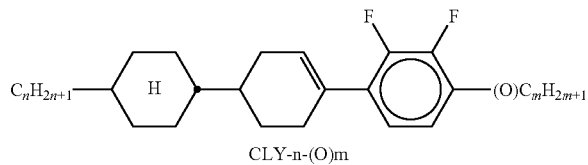
CLY-n-(O)m
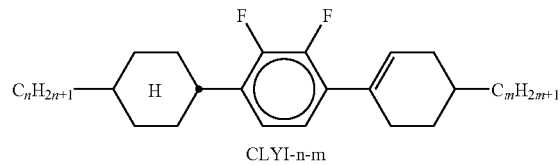
CLYI-n-m
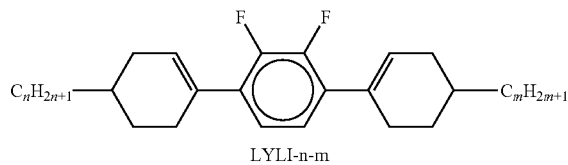
LYLI-n-m
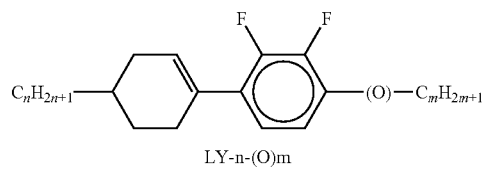
LY-n-(O)m
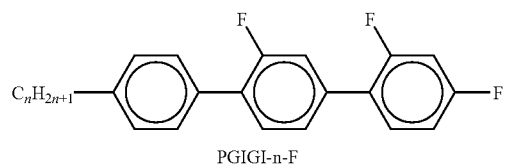
PGIGI-n-F
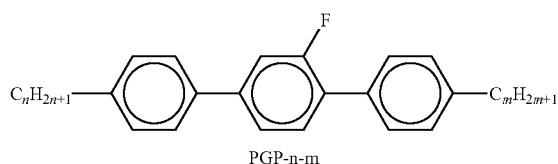
PGP-n-m
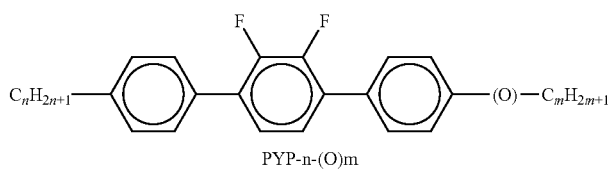
PYP-n-(O)m
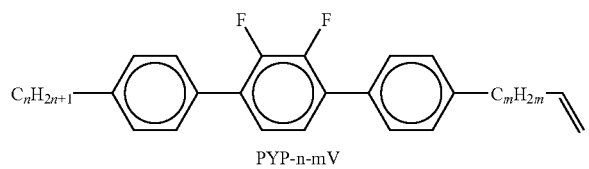
PYP-n-mV
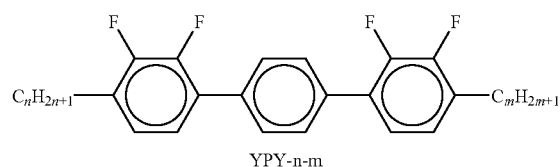
YPY-n-m TABLE A-continued
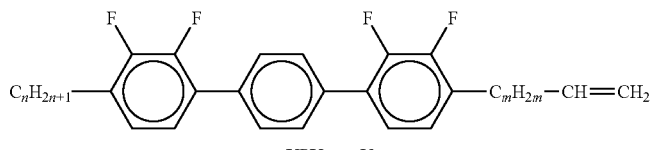
YPY-n-mV
BCH-nm
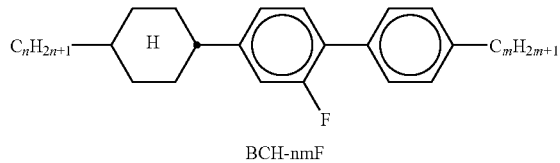
BCH-nmF
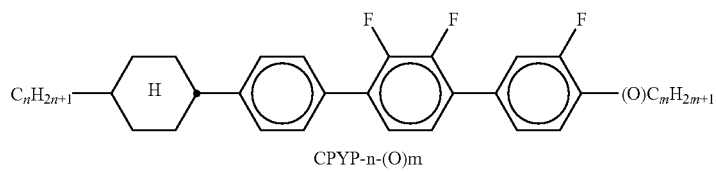
CPYP-n-(O)m
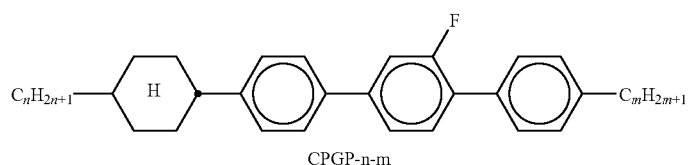
CPGP-n-m
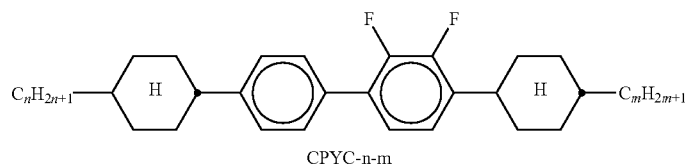
CPYC-n-m
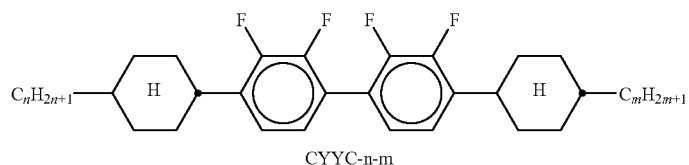
CYYC-n-m
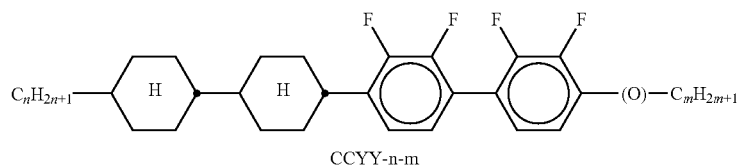
CCYY-n-m
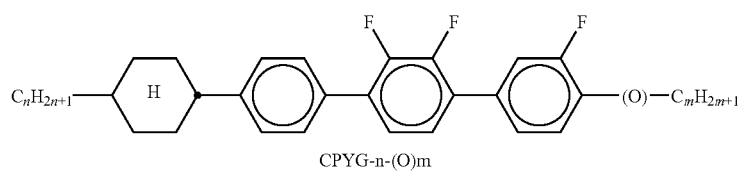
CPYG-n-(O)m TABLE A-continued
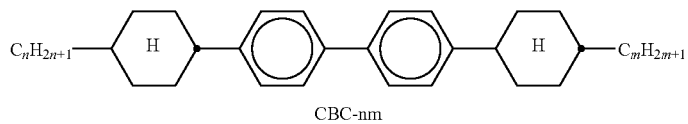
CBC-nm
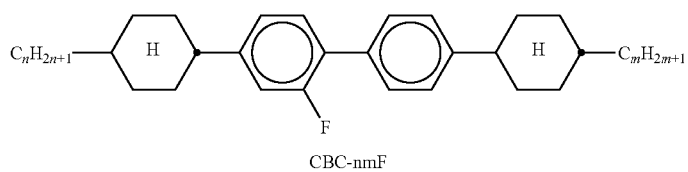
CBC-nmF
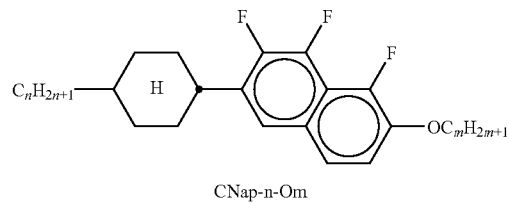
CNap-n-Om
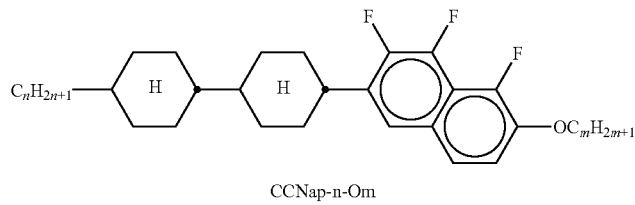
CCNap-n-Om
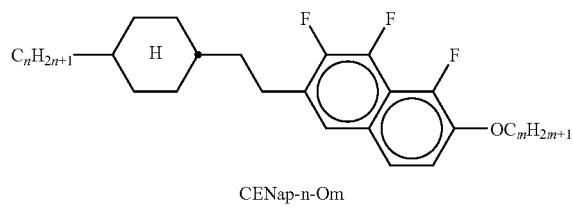
CENap-n-Om
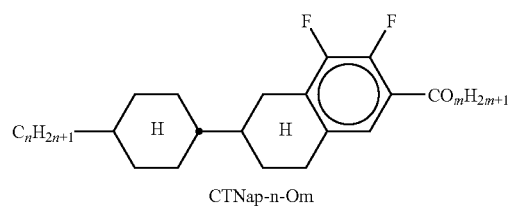
CTNap-n-Om
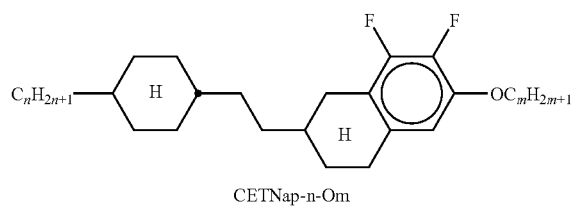
CETNap-n-Om
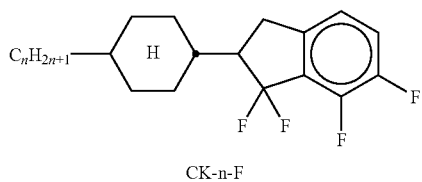
CK-n-F

TABLE A-continued
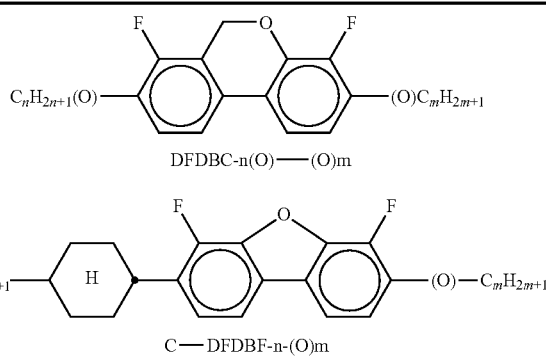
In a preferred embodiment of the present invention, the LC media according to the invention comprise one or more compounds selected from the group consisting of compounds from Table A.
TABLE B
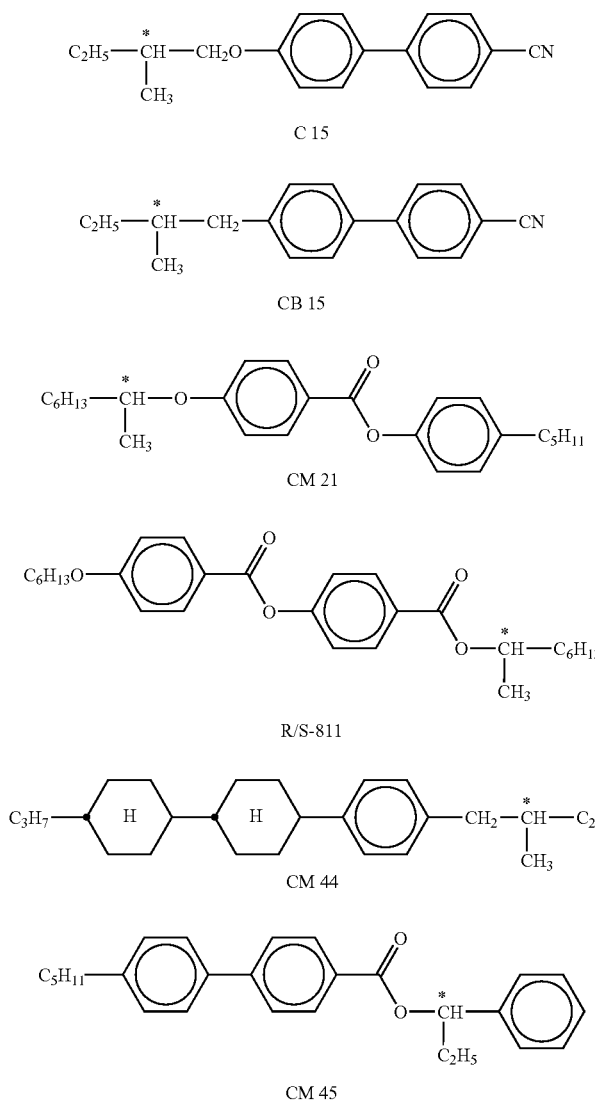

TABLE B-continued
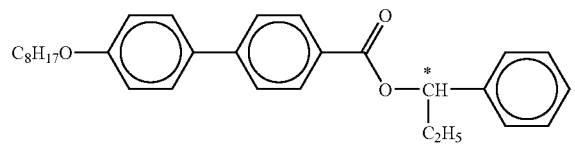
CM 47
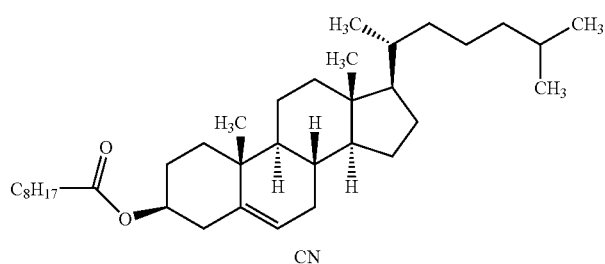
CN
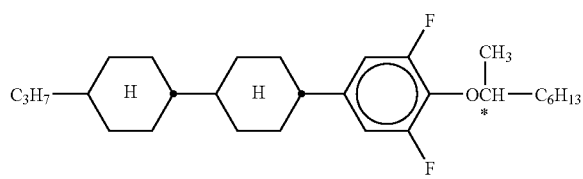
R/S-2011
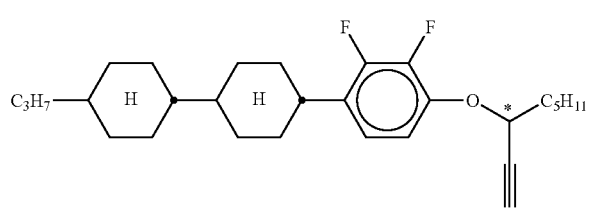
R/S-3011
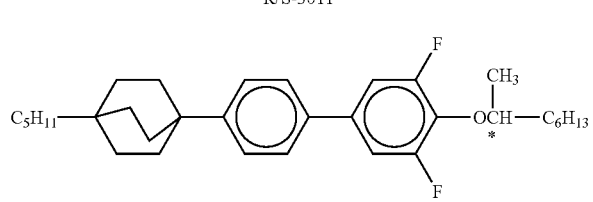
R/S-4011
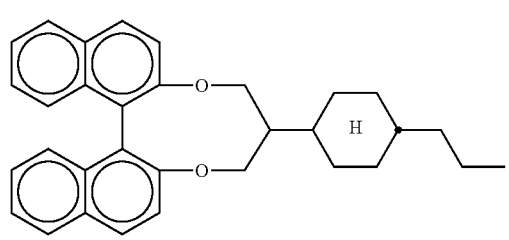
R/S-5011
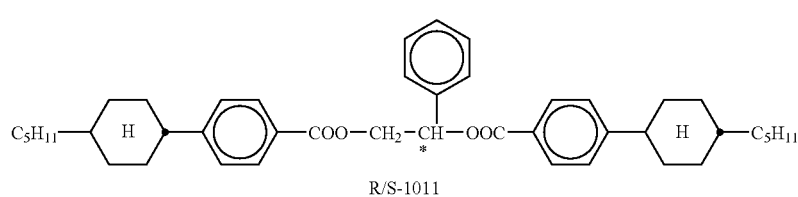
R/S-1011

Table B indicates possible dopants which can be added to the LC media according to the invention.

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table B.

Table C indicates possible stabilisers which can be added to the LC media according to the invention.

(n here denotes an integer from 1 to 12)

TABLE C

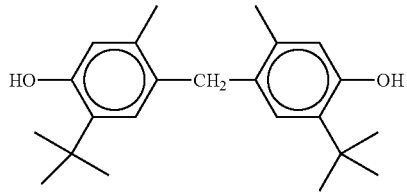

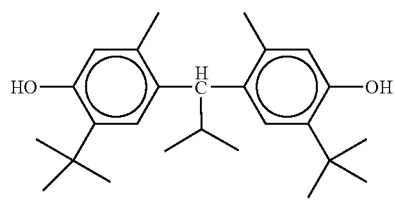

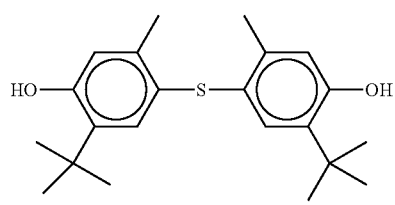

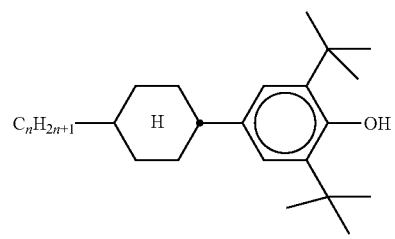

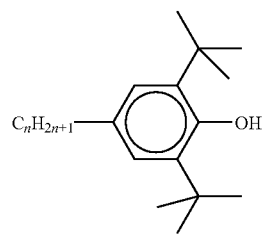

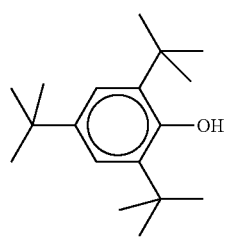

TABLE C-continued
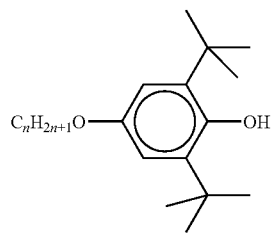
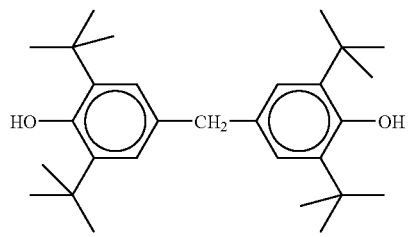
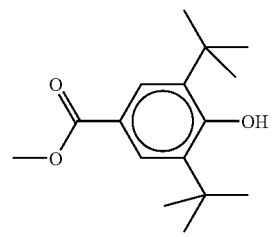
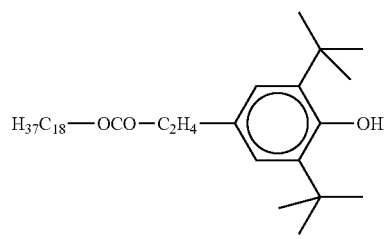
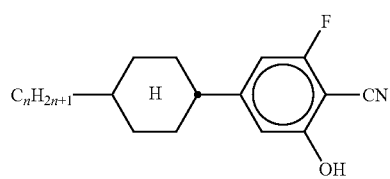
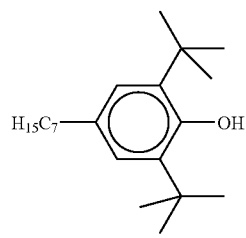
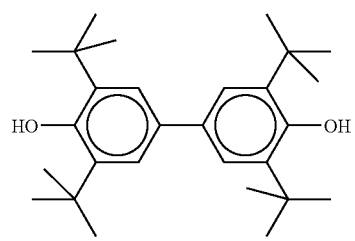

TABLE C-continued
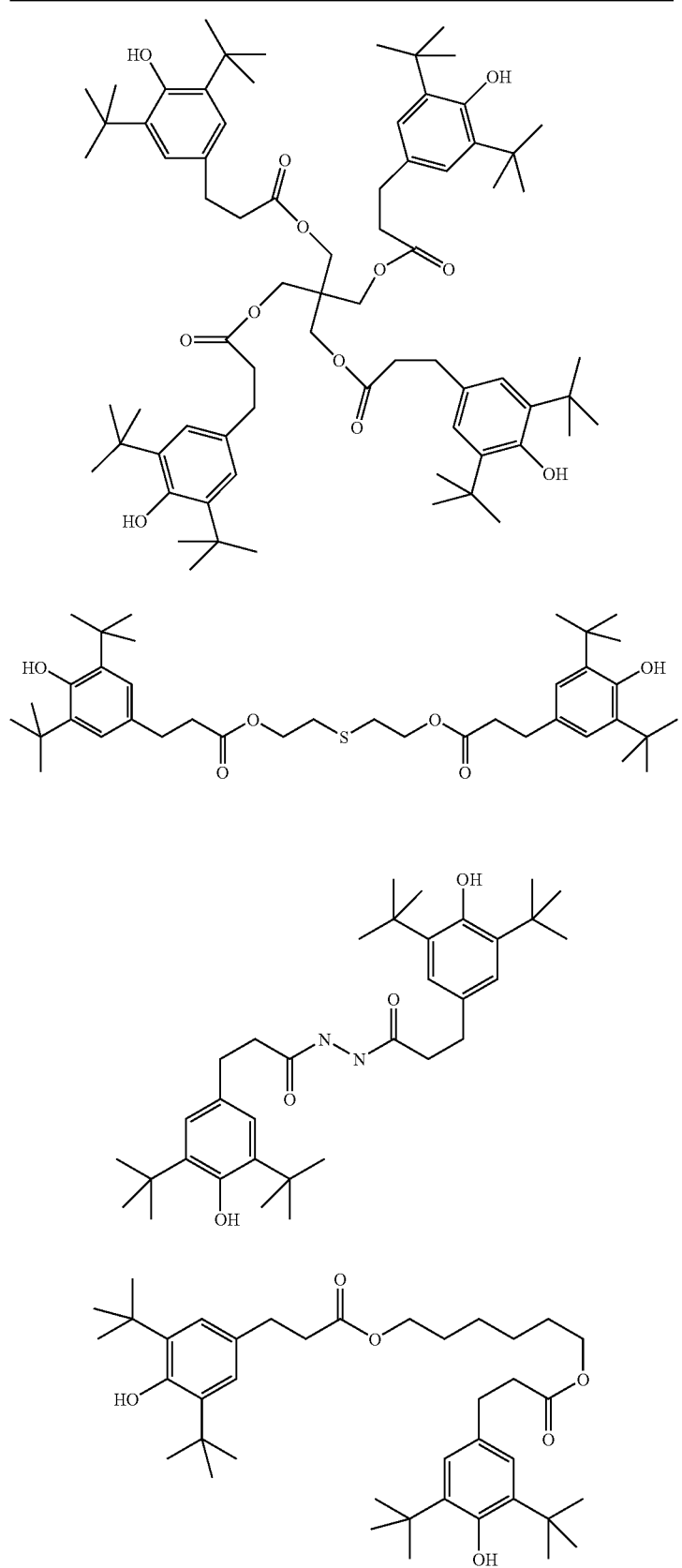

TABLE C-continued
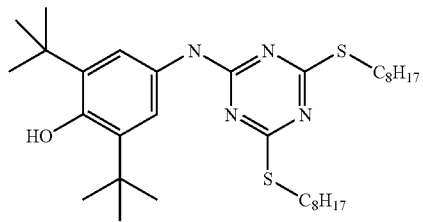
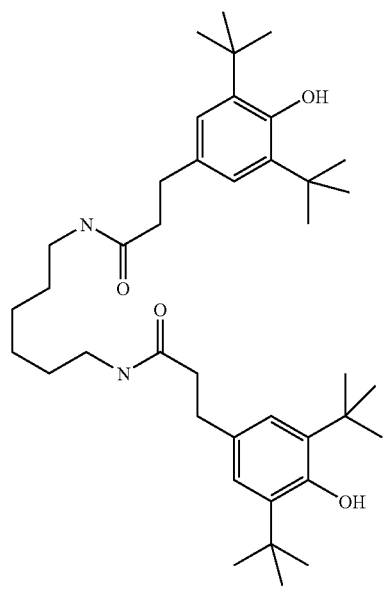
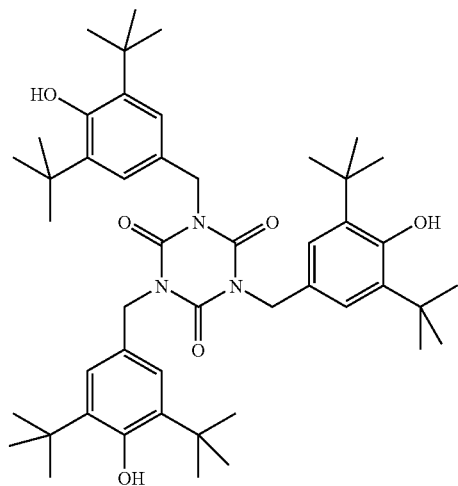

TABLE C-continued
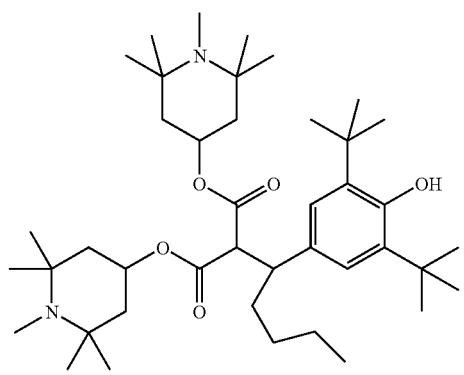
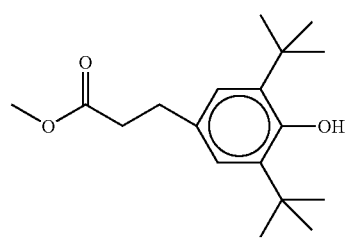
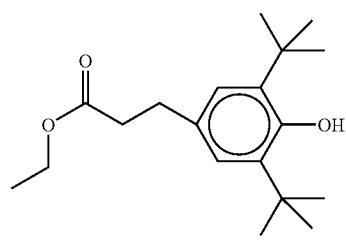
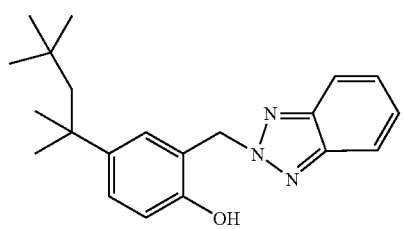
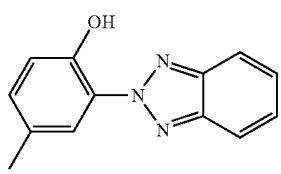
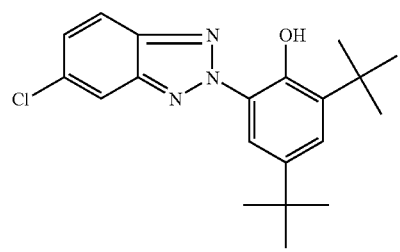

TABLE C-continued
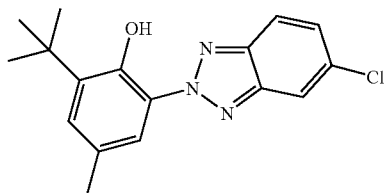
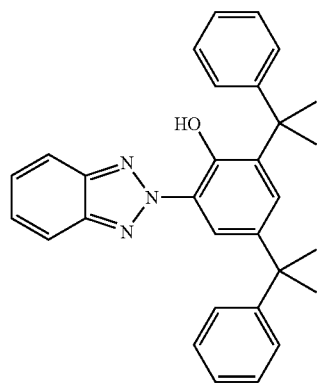
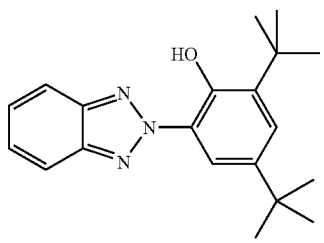
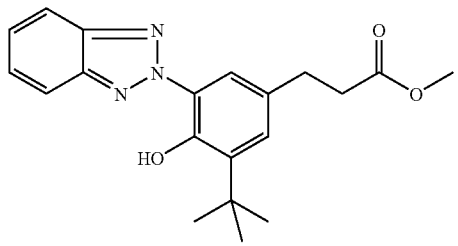
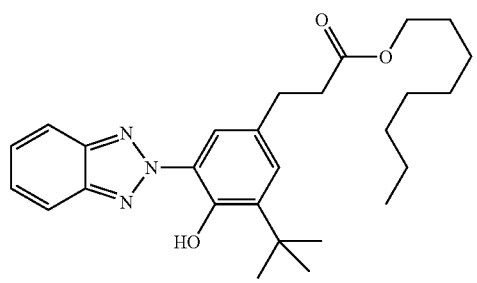

TABLE C-continued
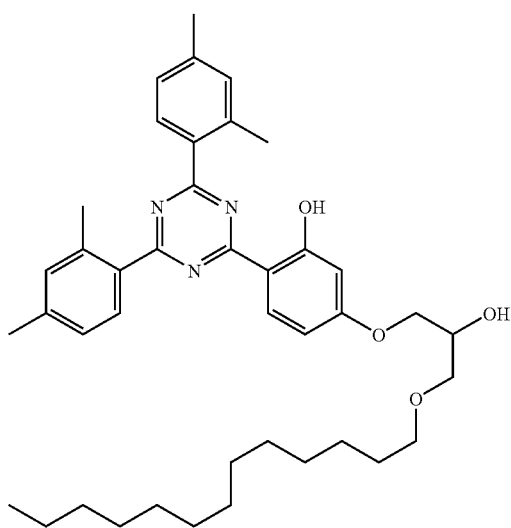
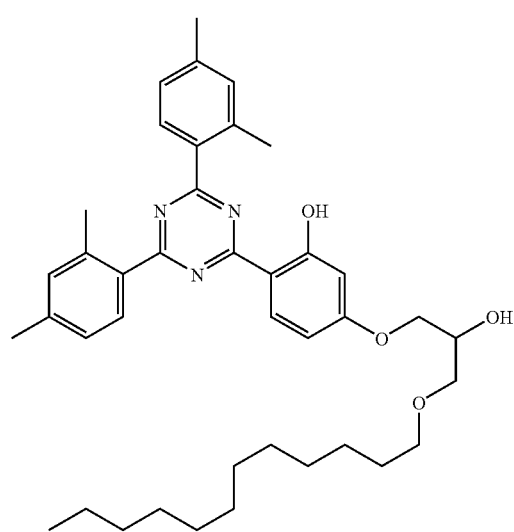
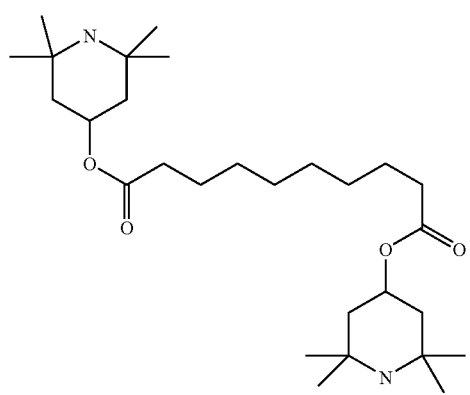

TABLE C-continued

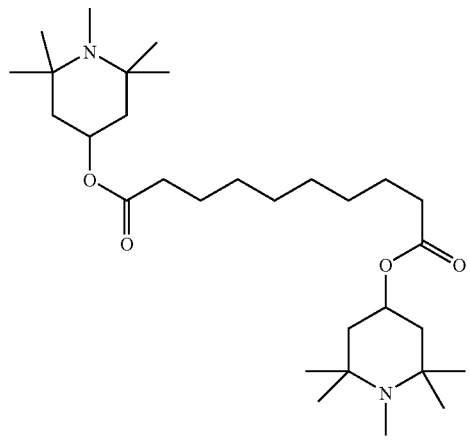

The LC media preferably comprise 0 to 10% by weight, in particular 0.01 to 5% by weight and particularly preferably 0.1 to 3% by weight, of stabilisers. The LC media preferably comprise one or more stabilisers selected from the group consisting of compounds from Table C.

Furthermore, $V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
$\Delta n$ denotes optical anisotropy at 20° C. and 589 nm,
$\epsilon_\perp$ denotes dielectric susceptibility perpendicular to the director at 20° C. and 1 kHz,
$\epsilon_\parallel$ denotes dielectric susceptibility parallel to the director at 20° C. and 1 kHz,
$\Delta\epsilon$ denotes dielectric anisotropy at 20° C. and 1 kHz,
cl.p., T(N,I) denotes clearing point [° C.],
$\gamma_1$ denotes rotational viscosity at 20° C. [mPa·s],
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN],
LTS denotes low-temperature stability (phase), determined in test cells,
$HR_{20}$ denotes voltage holding ratio at 20° C. [%], and
$HR_{100}$ denotes voltage holding ratio at 100° C. [%].

Unless explicitly noted otherwise, all concentrations in the present application are indicated in percent by weight and relate to the corresponding mixture or mixture component, unless explicitly indicated otherwise.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.).

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ is determined at 1 kHz, unless explicitly indicated otherwise in each case.

For the present invention, the term "threshold voltage" relates to the capacitive threshold ($V_0$), also known as the Freedericksz threshold, unless explicitly indicated otherwise.

In the examples, as is generally usual, the optical threshold for 10% relative contrast ($V_{10}$) may also be indicated.

The display used for measurement of the capacitive threshold voltage has two plane-parallel outer plates at a separation of 4 μm and electrode layers with overlying alignment layers of rubbed polyimide on the insides of the outer plates, which cause a homeotropic edge alignment of the liquid-crystal molecules.

The polymerisable compounds are polymerised in the display by UV irradiation for a pre-determined time, with a voltage simultaneously being applied to the display (usually 10 V to 30 V alternating current, 1 kHz). In the examples, unless indicated otherwise, a 28 mW/cm² mercury vapour lamp was used, the intensity was measured using a standard UV meter (model Ushio UNI meter) fitted with a 365 nm band-pass filter.

The tilt angle is determined by a rotational crystal experiment (Autronic-Melchers TBA-105). A small value (i.e. a large deviation from a 90° angle) corresponds to a large tilt here.

EXAMPLE 1

4'-[3-(2-Methylacryloyloxy)propoxy]biphenyl-4-yl 2-methylacrylate (1) is prepared as follows:

1.1. 4'-(3-Hydroxypropoxy)biphenyl-4-ol

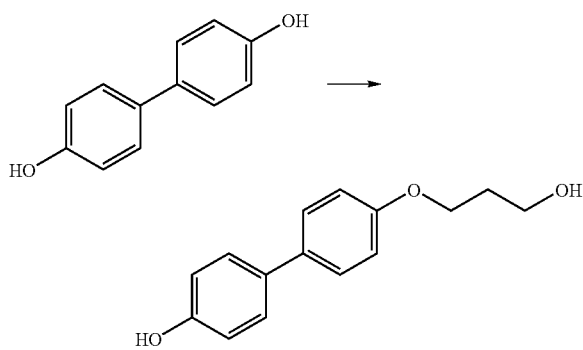

20.0 g (0.107 mol) of 4,4'-dihydroxybiphenyl, 10.0 g (0.070 mol) of 3-bromo-1-propanol and 15.0 g (0.109 mol) of potassium carbonate are heated under reflux in 300 ml of acetone for 16 h. The batch is subsequently filtered, and the filtrate is evaporated. The residue is taken up in MTB ether, washed with water and dried over sodium sulfate. The solvent is removed in vacuo, and the crude product is chromatographed on silica gel with toluene/ethyl acetate (1:1). Crystallisation from toluene/ethyl acetate gives 4'-(3-hydroxypropoxy)biphenyl-4-ol as a colourless solid.

1.2. 4'-[3-(2-Methylacryloyloxy)propoxy]biphenyl-4-yl 2-methylacrylate

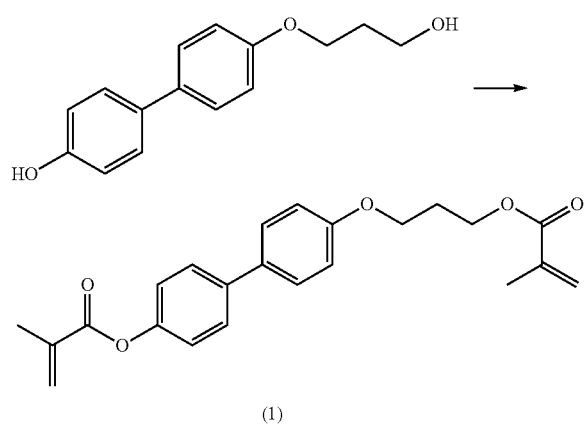

4.50 g (18.4 mmol) of 4'-(3-hydroxypropoxy)biphenyl-4-ol, 6.5 ml (0.766 mol) of methacrylic acid and 0.5 g of N,N-dimethylaminopyridine (DMAP) are initially introduced in 250 ml of toluene, a solution of 16.0 g (0.775 mol) of N,N'-dicyclohexylcarbodiimide is added with ice-cooling, and the mixture is stirred overnight at room temp. After addition of 6.5 g of oxalic acid dihydrate, the batch is stirred for 1 h and filtered, and the filtrate is evaporated. The residue is filtered through silica gel with heptane/ethyl acetate (2:1) and recrystallised from diethyl ether, giving 3'-(2-methacryloyloxy)biphenyl-3-yl 2-methylacrylate as colourless crystals of m.p. 102° C.

EXAMPLE 2

4'-(2-Methylacryloyloxymethyl)biphenyl-4-yl 2-methylacrylate (2) is prepared as follows:

2.1. 4'-Hydroxymethyl-4-biphenylol

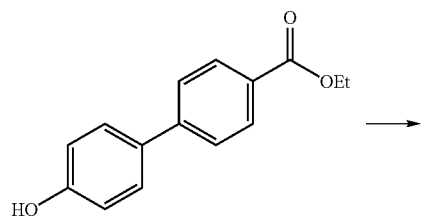

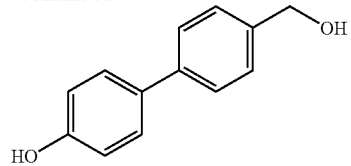

15.0 g (60.7 mmol) of ethyl 4-hydroxybiphenyl-4-carboxylate are dissolved in 500 ml of THF, and 200 ml of a 1 M solution of diisobutylaluminium hydride in toluene are added at −70° C. The cooling is subsequently removed, and the batch is stirred at room temp. for 2 h. After addition of 5 ml of isopropanol, the solution is added to water, extracted three times with MTB ether, and the combined org. phases are washed with water and dried over sodium sulfate. The solvent is removed in vacuo, and the residue is filtered through silica gel with toluene/ethyl acetate, giving 4'-hydroxymethyl-4-biphenylol as a colourless solid.

$^1$H-NMR (DMSO-d$_6$, 300 MHz): δ=4.51 ppm (s, 2H, —CH$_2$OH), 5.13 (s, br., exchangeable, 1H, OH), 6.83 (AB-m$_c$, 2H, Ar—H), 7.34 (AB-d, J=8.3 Hz, 2H, Ar—H), 7.46 (AB-m$_c$, 2H, Ar—H), 7.52 (AB-m$_c$, 2H, Ar—H), 9.51 (s, br., exchangeable, 1H, OH).

2.2. 4'-(2-Methylacryloyloxymethyl)biphenyl-4-yl 2-methylacrylate

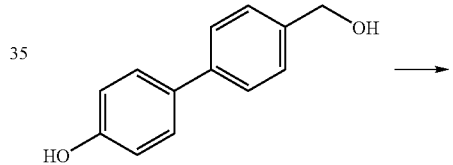

Analogously to the esterification described under 1.2., 4'-hydroxymethyl-4-biphenylol and methacrylic acid give 4'-(2-methylacryloyloxymethyl)biphenyl-4-yl 2-methylacrylate as a colourless solid of m.p. 71° C.

EXAMPLE 3

4'-(Acryloyloxymethyl)biphenyl-4-ylacrylate (3) is prepared analogously to Example 2.

(3)

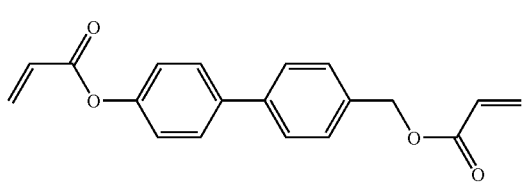

4'-(Acryloyloxymethyl)biphenyl-4-ylacrylate is obtained as colourless crystals of m.p. 62° C.

The following are obtained analogously to Example 1 from commercially available precursors.

EXAMPLE 4

3-[4-(2-Methylacryloyloxy)phenoxy]propyl 2-methylacrylate (4) is prepared analogously to Example 1, (4)

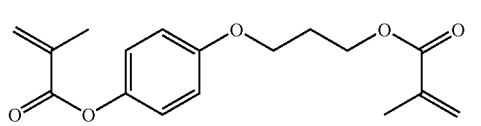

giving colourless crystals of m.p. 58° C.

EXAMPLE 5

6-[3-(2-Methylacryloyloxy)propoxy]naphth-2-yl 2-methylacrylate (5) is prepared analogously to Example 1, (5)

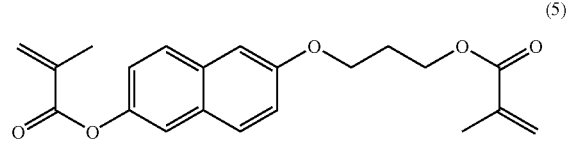

giving colourless crystals of m.p. 68° C.

EXAMPLE 6

3-[4'-(2-Methylacryloyloxy)biphenyl-4-yl]propyl 2-methylacrylate (6) is prepared analogously to Example 2, (6)

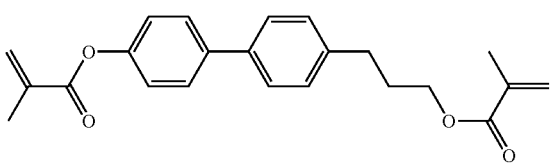

giving colourless crystals of m.p. 69° C.

EXAMPLE 7

2-[4'-(2-Methylacryloyloxy)biphenyl-4-yl]ethyl 2-methylacrylate (7) is prepared analogously to Example 2, (7)

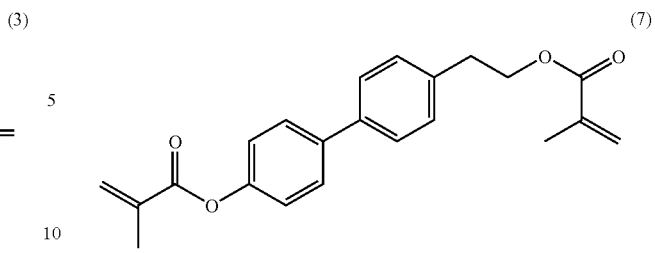

giving colourless crystals of m.p. 108° C.

EXAMPLE 8

The solubility of compounds (1) and (5) is compared with the solubility of the structurally analogous compounds (A) and (B) containing no spacer group which are known from the prior art (for example EP 1 498 468 A1):

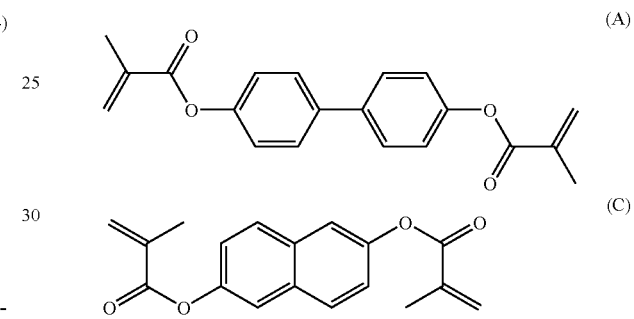

To this end, each compound is dissolved with stirring at 50° C. (½ hour) in the commercially available nematic LC mixture LCT-06-441 (Merck KGaA, Darmstadt) in a concentration of 5% by weight and then cooled to room temperature without stirring. Result:
(1): crystallises out overnight at RT
(5): crystallises out slightly overnight at RT
(A): crystallises out immediately on cooling to RT
(C): crystallises out immediately on cooling to RT The compounds according to the invention containing a spacer group exhibit significantly better solubility than the compounds from the prior art containing no spacer group.

EXAMPLE 9

Mixture Examples

Nematic LC host mixture N1 is formulated as follows:

| | | | |
|---|---|---|---|
| CCH-501 | 9.00% | Cl.p. | +70.0 |
| CCH-35 | 14.00% | $\Delta n$ | 0.0825 |
| PCH-53 | 8.00% | $\Delta\epsilon$ | −3.5 |
| CY-3-O4 | 14.00% | $\epsilon_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

0.3% of a polymerisable monomeric compound from Examples 1 to 6 is added to LC mixture N1, and the resultant mixtures are introduced into VA-e/o test cells (rubbed at 90°, alignment layer VA-polyimide, layer thickness d≈4 μm). Each cell is irradiated with UV light having an intensity of 28 mW/cm² for 20 minutes with application of a voltage of 10 V (alternating current), causing polymerisation of the monomeric compound. In a second series of experiments, 0.006% of the photoinitiator Irgacure 651 is additionally added to the LC/monomer mixture, and the exposure time is shortened to 2 minutes. The tilt angle is determined before and after the UV irradiation by means of a rotational crystal experiment (Autronic-Melchers TBA-105).

For comparative purposes, the experiments described above are carried out with the structurally analogous polymerisable compounds (A), (B) and (C) known from the prior art which contain no spacer groups.

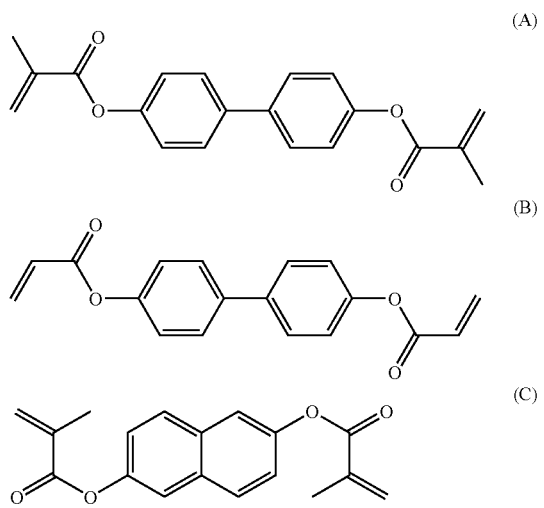

The results are summarised in Table 1.

TABLE 1

| Monomer | Initiator | Tilt before UV | Tilt after UV |
| --- | --- | --- | --- |
| (1) | no | 89.9° | 84.9° |
| (1) | yes | 89.9° | 86.8° |
| (2) | no | 89.9° | 86.3° |
| (2) | yes | 89.9° | 88.0° |
| (3) | no | 89.8° | 86.9° |
| (3) | yes | 84.9° | 84.2° |
| (4) | no | 89.9° | 88.5° |
| (4) | yes | 89.9° | 88.7° |
| (5) | no | 89.9° | 85.5° |
| (5) | yes | 89.8° | 87.4° |
| (6) | no | 89.8° | 82.2° |
| (6) | yes | 89.9° | 87.2° |
| (A) | no | 89.7° | 81.8° |
| (A) | yes | 89.8° | 84.8° |
| (B) | no | 89.6° | 86.2° |
| (B) | yes | 89.7° | 87.0° |
| (C) | no | 89.8° | 82.1° |
| (C) | yes | 89.6° | 83.5° |

As can be seen from Table 1, an adequately large tilt (i.e. small tilt angle) can also be achieved after polymerisation with monomers (1)-(6) according to the invention, in particular without use of a photoinitiator.

Owing to their better solubility (see Example 8), compounds (1)-(6) according to the invention are thus particularly suitable for use in PS(A) displays.

EXAMPLE 10

Mixture Examples

An LC medium consisting of 99.00% of the nematic LC host mixture N2

| CY-3-O4 | 24.00% | Cl.p. | +88.2 |
| --- | --- | --- | --- |
| CY-5-O4 | 10.00% | Δn | 0.1443 |
| CCY-3-O2 | 6.00% | Δε | −5.9 |
| CCY-3-O3 | 6.00% | ε∥ | 4.2 |
| CCY-4-O2 | 6.00% | $K_3/K_1$ | 1.09 |
| CCY-5-O2 | 4.00% | $\gamma_1$ | 331 |
| CPY-2-O2 | 10.00% | | |
| CPY-3-O2 | 10.00% | | |
| PYP-2-3 | 14.00% | | |
| PYP-2-4 | 10.00% | | |

0.25% of the polymerisable monomeric compound from Example 6, and 0.75% of the chiral dopant S-4011, is suitable for use in a PS-VA display.

EXAMPLE 11

Mixture Examples

An LC medium consisting of 99.00% of the nematic LC host mixture N2 (see example 10), 0.25% of the polymerisable monomeric compound from Example 7, and 0.75% of the chiral dopant S-4011, is suitable for use in a PS-VA display.

EXAMPLE 12

Mixture Examples

An LC medium consisting of 99.50% of the nematic LC host mixture N2 (see example 10), 0.25% of the polymerisable monomeric compound from Example 6, and 0.25% of the chiral dopant S-5011, is suitable for use in a PS-VA display.

EXAMPLE 13

Mixture Examples

An LC medium consisting of 99.50% of the nematic LC host mixture N2 (see example 10), 0.25% of the polymerisable monomeric compound from Example 7, and 0.25% of the chiral dopant S-5011, is suitable for use in a PS-VA display.

The invention claimed is:

1. A polymer stabilized or polymer sustained alignment liquid-crystal display, comprising a polymerizable compound containing a mesogenic group and two or more polymerizable groups, of which at least one polymerizable group is linked to the mesogenic group via a spacer group and of which at least one polymerizable group is linked to the mesogenic group without a spacer group.

2. A display according to claim 1, wherein the polymerizable compound contains a mesogenic group having two, three or four hydrocarbon rings, which are five- or six-membered rings, which may also be fused and may also contain one or more heteroatoms.

3. A polymer stabilized or polymer sustained alignment liquid-crystal display, comprising a polymerizable compound is of formula I:

$$P^a\text{-Sp-}A^1\text{-}(Z^1\text{-}A^2)_{m1}\text{-}P^b \quad (I)$$

in which
- $P^a$ and $P^b$ each, independently of one another, denote a polymerizable group,
- Sp denotes a spacer group,
- $A^1$ and $A^2$ each, independently of one another, denote an aromatic, heteroaromatic, alicyclic or heterocyclic group, which may contain fused rings and which may be mono- or polysubstituted by L,
- L denotes H, OH, halogen, $SF_5$, $NO_2$, a carbon group or hydrocarbon group,
- $Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, $CR^0R^{00}$ or a single bond,
- $R^0$ and $R^{00}$ each, independently of one another, denote H or alkyl having 1 to 12 C atoms,
- m1 denotes 0, 1, 2, 3 or 4, and
- n1 denotes 1, 2, 3 or 4.

4. A display according to claim 3, containing a liquid-crystal cell having two substrates, where at least one substrate is transparent to light and at least one substrate has an electrode layer, and a layer of an LC medium comprising a polymerized component and a low-molecular-weight component located between the substrates, where the polymerized component is obtainable by polymerization of one or more polymerizable compounds between the substrates of the liquid-crystal cell with application of an electrical voltage, wherein at least one of the polymerizable compounds is a compound of formula I.

5. A display according to claim 4, wherein the polymerized component consists exclusively of one or more polymerizable compounds of formula I.

6. A display according to claim 3, wherein
- $A^1$ and $A^2$ each, independently of one another, denote 1,4-phenylene, naphthalene-1,4-diyl or naphthalene-2,6-diyl, in which one or more CH groups may be replaced by N, cyclohexane-1,4-diyl, in which one or more non-adjacent CH$_2$ groups may be replaced by O and/or S, or 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, all of which may be unsubstituted or mono- or polysubstituted by L,
- L denotes P—, P-Sp-, OH, CH$_2$OH, F, Cl, Br, I, —CN, —NO$_2$, —NCO, —NCS, —OCN, —SCN, —C(=O)N(Rx)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms may be replaced by F, Cl, P— or P-Sp-,
- P denotes a polymerizable group,
- $Y^1$ denotes halogen, and
- $R^x$ denotes P—, P-Sp-, H, halogen, straight-chain, branched or cyclic alkyl having 1 to 25 C atoms, in which one or more non-adjacent CH$_2$ groups may be replaced by —O—, —S—, —CO—, —CO—O—, —O—CO—, or —O—CO—O— in such a way that O and/or S atoms are not linked directly to one another, and in which one or more H atoms may be replaced by F, Cl, P— or P-Sp-, an optionally substituted aryl or aryloxy group having 6 to 40 C atoms or an optionally substituted heteroaryl or heteroaryloxy group having 2 to 40 C atoms.

7. A display according to claim 3, wherein the polymerizable compound is a compound of one of the following formulae

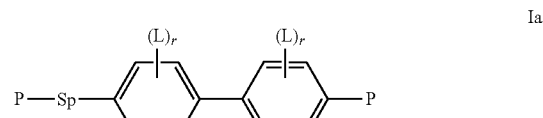

Ia

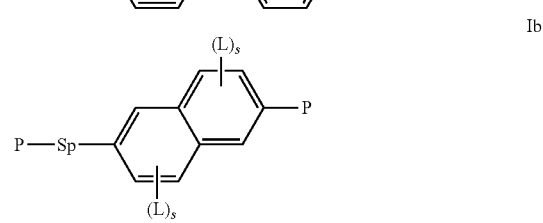

Ib

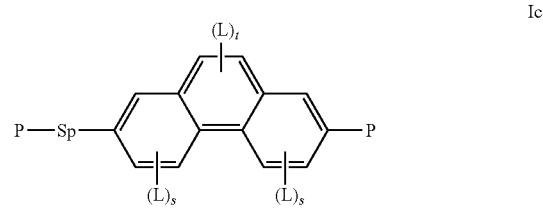

Ic

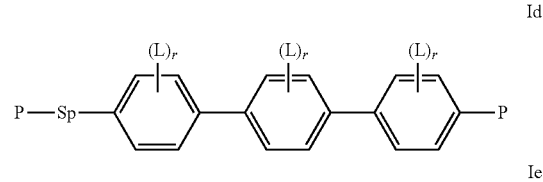

Id

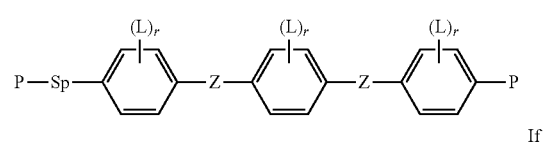

Ie

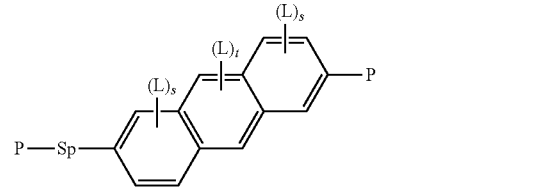

If

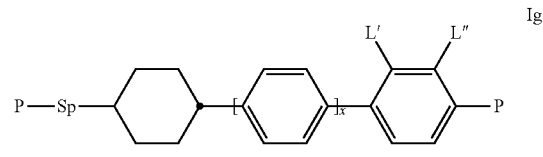

Ig

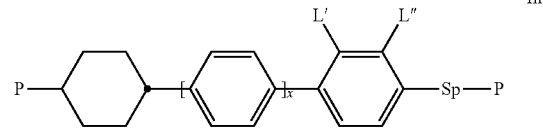

Ih

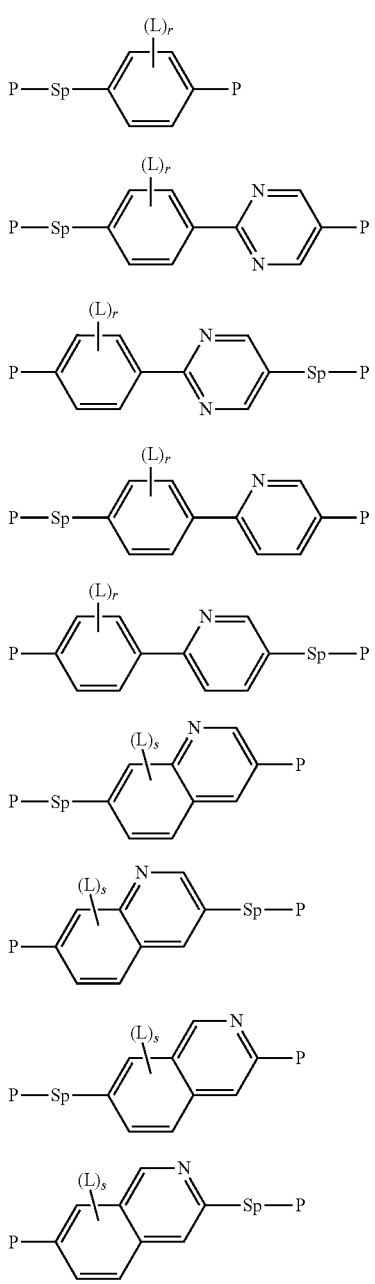

in which
P denotes a polymerizable group,
Sp denotes a spacer group,
L denotes H, OH, halogen, $SF_5$, $NO_2$, a carbon group or hydrocarbon group,
L' and L" each, independently of one another, denote H, F or Cl,
Z on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, $CR^0R^{00}$ or a single bond, $R^0$ and $R^{00}$ each, independently of one another, denote H or alkyl having 1 to 12 C atoms,
n1 denotes 1, 2, 3 or 4,
x is 0 or 1,
r is 0, 1, 2, 3 or 4,
s is 0, 1, 2 or 3, and
t is 0, 1 or 2.

8. A display according to claim 3, which contains one or more compounds of the following formulae:

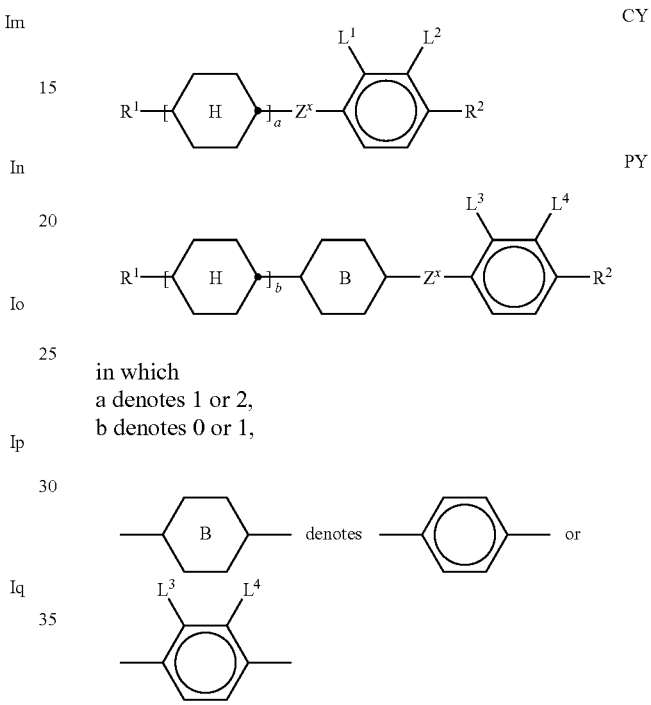

in which
a denotes 1 or 2,
b denotes 0 or 1,

$R^1$ and $R^2$ each, independently of one another, denote alkyl having 1 to 12 C atoms, in which one or two non-adjacent CH$_2$ groups may be replaced by —O—, —CH=CH—, —CO—, —OCO— or —COO— in such a way that O atoms are not linked directly to one another,
$Z^x$ denotes —CH=CH—, —CH$_2$O—, —OCH$_2$—, —CF$_2$O—, —OCF$_2$—, —O—, —CH$_2$—, —CH$_2$CH$_2$— or a single bond, and
$L^{1-4}$ each, independently of one another, denote F, Cl, OCF$_3$, CF$_3$, CH$_3$, CH$_2$F, or CHF$_2$.

9. A display according to claim 3, which contains one or more compounds of the following formula:

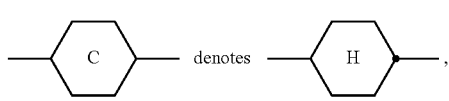

in which

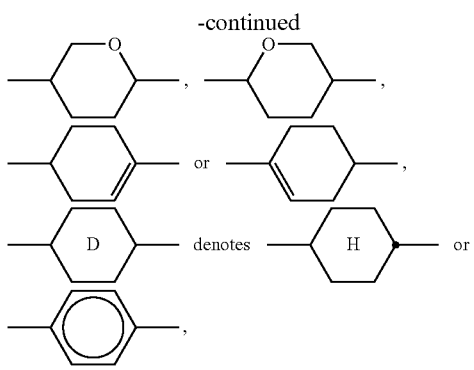

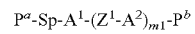

R[3] and R[4] each, independently of one another, denote alkyl having 1 to 12 C atoms, in which one or two non-adjacent CH$_2$ groups may be replaced by —O—, —CH=CH—, —CO—, —OCO— or —COO— in such a way that O atoms are not linked directly to one another, and Z[y] denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

10. A display according to claim 3, which is a PSA-VA, PSA-OCB, PS—IPS, PS—FFS or PS-TN display.

11. A display according to claim 7, wherein

L denotes P—, P-Sp-, OH, CH$_2$OH, F, Cl, Br, I, —CN, —NO$_2$, —NCO, —NCS, —OCN, —SCN, —C(=O)N(R[x])$_2$, —C(=O)Y', —C(=O)R[x], —N(R[x])$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms may be replaced by F, Cl, P— or P-Sp-, Y[1] denotes halogen, and R[x] denotes P—, P-Sp-, H, halogen, straight-chain, branched or cyclic alkyl having 1 to 25 C atoms, in which one or more non-adjacent CH$_2$ groups may be replaced by —O—, —S—, —CO—, —CO—O—, —O—CO—, or —O—CO—O— in such a way that O and/or S atoms are not linked directly to one another, and in which one or more H atoms may be replaced by F, Cl, P— or P-Sp-, an optionally substituted aryl or aryloxy group having 6 to 40 C atoms or an optionally substituted heteroaryl or heteroaryloxy group having 2 to 40 C atoms.

12. A display according to claim 7, wherein

Z on each occurrence, identically or differently, denotes —COO—, —OCO— or a single bond.

13. A display according to claim 8, wherein

Z[x] denotes a single bond.

14. A display according to claim 3, wherein

A[1] and A[2] each, independently of one another, denote an aromatic, heteroaromatic, alicyclic or heterocyclic group having 4 to 25 C atoms, which may contain fused rings and which may be mono- or polysubstituted by L.

15. A liquid-crystalline medium comprising a polymerizable component A) comprising one or more polymerizable compounds containing a mesogenic group and two or more polymerizable groups, of which at least one polymerizable group is linked to the mesogenic group via a spacer group and of which at least one polymerizable group is linked to the mesogenic group without a spacer group, and a liquid-crystalline component B) comprising one or more low-molecular-weight compounds.

16. A liquid-crystalline medium comprising a polymerizable component A) comprising one or more polymerizable compounds of formula I:

$$P^a\text{-Sp-}A^1\text{-}(Z^1\text{-}A^2)_{m1}\text{-}P^b \quad \text{I}$$

in which

P[a] and P[b] each, independently of one another, denote a polymerizable group,

S[p] denotes a spacer group,

A[1] and A[2] each, independently of one another, denote an aromatic, heteroaromatic, alicyclic or heterocyclic group, which may contain fused rings and which may be mono- or polysubstituted by L, L denotes H, OH, halogen, SF$_5$, NO$_2$, a carbon group or hydrocarbon group, Z[1] on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR[0]R[00] or a single bond, R[0] and R[00] each, independently of one another, denote H or alkyl having 1 to 12 C atoms, m1 denotes 0, 1, 2, 3 or 4, and n1 denotes 1, 2, 3 or 4 and a liquid-crystalline component B) comprising one or more low-molecular-weight compounds.

17. A liquid-crystalline medium according to claim 16, in which component B) comprises one or more compounds of the following formulae CY, PY or ZK or a combination thereof:

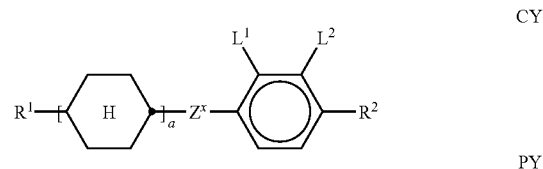

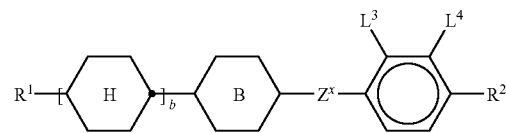

in which a denotes 1 or 2, b denotes 0 or 1,

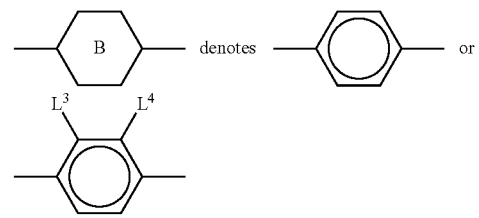

R[1] and R[2] each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another, $Z^x$ denotes —CH=CH—, —CH₂O—, —OCH₂—, —CF₂O—, —OCF₂—, —O—, —CH₂—, —CH₂CH₂— or a single bond, and $L^{1-4}$ each, independently of one another, denote F, Cl, OCF₃, CF₃, CH₃, CH₂F, or CHF₂,

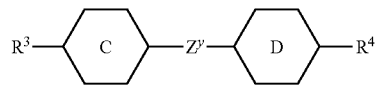   ZK in which

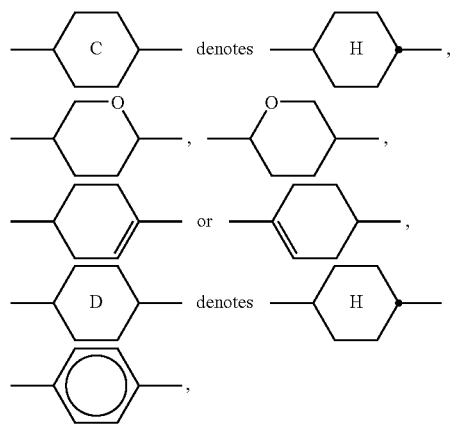

$R^3$ and $R^4$ each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another, and $Z^y$ denotes —CH₂CH₂—, —CH=CH—, —CF₂O—, —OCF₂—, —CH₂O—, —OCH₂—, —COO—, —OCO—, —C₂F₄—, —CF=CF— or a single bond.

18. A process for preparing a liquid-crystalline medium according to claim 16, comprising mixing together the one or more low-molecular-weight liquid-crystalline compounds with the one or more compounds of formula I, and optionally with further liquid-crystalline compounds and/or additives.

19. A liquid-crystalline medium according to claim 17, wherein $Z^x$ denotes a single bond.

20. A liquid-crystalline medium according to claim 13, in which in component A) the one or more polymerizable compounds are compounds of one of the following formulae

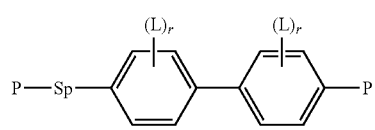   Ia

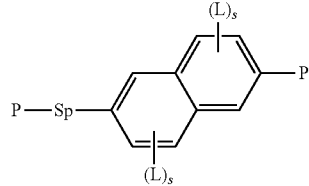   Ib

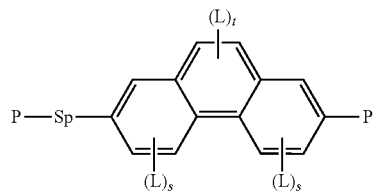   Ic

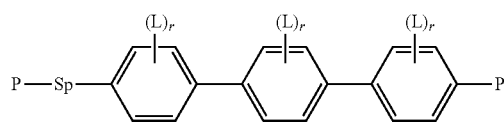   Id

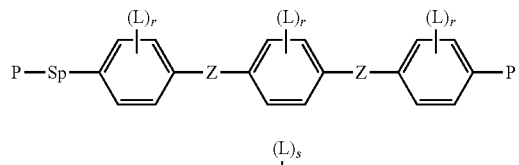   Ie

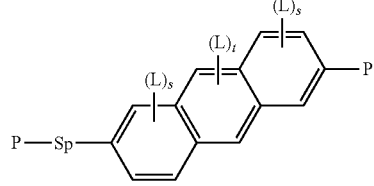   If

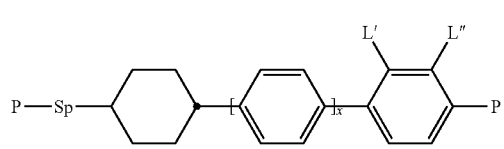   Ig

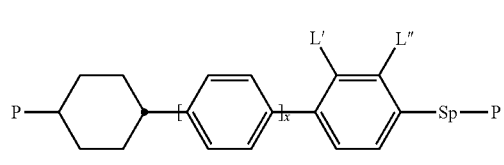   Ih

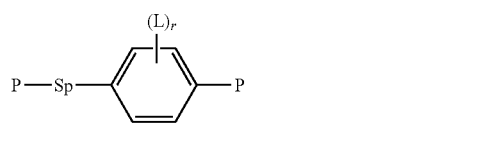   Ii

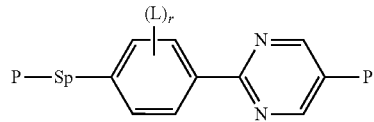   Ik

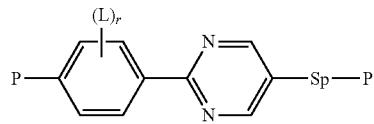   Im

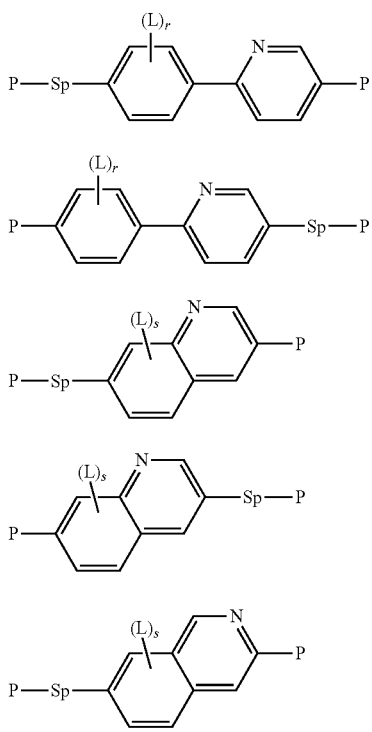
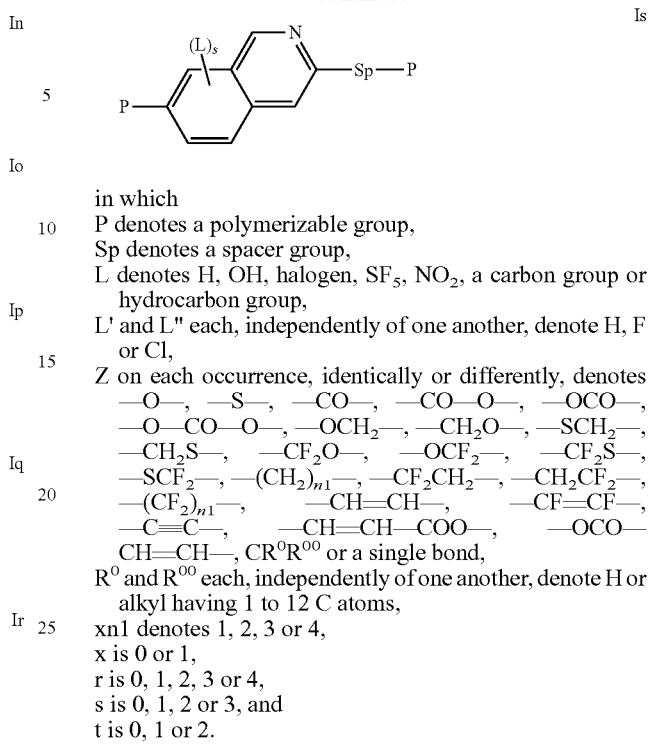

in which
P denotes a polymerizable group,
Sp denotes a spacer group,
L denotes H, OH, halogen, $SF_5$, $NO_2$, a carbon group or hydrocarbon group,
L' and L" each, independently of one another, denote H, F or Cl,
Z on each occurrence, identically or differently, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^oR^{oo}$ or a single bond,
$R^o$ and $R^{oo}$ each, independently of one another, denote H or alkyl having 1 to 12 C atoms,
xn1 denotes 1, 2, 3 or 4,
x is 0 or 1,
r is 0, 1, 2, 3 or 4,
s is 0, 1, 2 or 3, and
t is 0, 1 or 2.

\* \* \* \* \*